United States Patent
Yan et al.

(10) Patent No.: US 12,542,930 B2
(45) Date of Patent: *Feb. 3, 2026

(54) INVERTIBLE FILTERING FOR VIDEO CODING

(71) Applicant: BEIJING DAJIA INTERNET INFORMATION TECHNOLOGY CO., LTD., Beijing (CN)

(72) Inventors: Ning Yan, San Diego, CA (US); Yi-Wen Chen, San Diego, CA (US); Xiaoyu Xiu, San Diego, CA (US); Wei Chen, San Diego, CA (US); Che-Wei Kuo, San Diego, CA (US); Hong-Jheng Jhu, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,724

(22) Filed: May 21, 2024

(65) Prior Publication Data

US 2024/0305833 A1    Sep. 12, 2024

Related U.S. Application Data

(63) Continuation of application No. PCT/US2022/051136, filed on Nov. 29, 2022.
(Continued)

(51) Int. Cl.
*H04N 19/80* (2014.01)
*H04N 19/60* (2014.01)
*H04N 19/88* (2014.01)

(52) U.S. Cl.
CPC ............ *H04N 19/80* (2014.11); *H04N 19/60* (2014.11); *H04N 19/88* (2014.11)

(58) Field of Classification Search
CPC ......... H04N 19/80; H04N 19/60; H04N 19/88
See application file for complete search history.

(56) References Cited

U.S. PATENT DOCUMENTS

| 5,522,261 A | * | 6/1996 | Grover | G01P 5/10 |
| | | | | 73/204.18 |
| 6,097,843 A | * | 8/2000 | Takashima | G06T 9/007 |
| | | | | 382/232 |

(Continued)

FOREIGN PATENT DOCUMENTS

CN    110300301 B * 1/2023 ........... H04N 19/103

OTHER PUBLICATIONS

Liu, Dong translation of CN 110300301 B Mar. 22, 2018 (Year: 2018).*

(Continued)

*Primary Examiner* — Zaihan Jiang
(74) *Attorney, Agent, or Firm* — Bayes PLLC

(57) ABSTRACT

Implementations of the disclosure provide a video processing method for invertible filtering in video coding. The video processing method may include receiving, by a processor, an image derived from encoded video information stored in a bitstream. The video processing method may also include applying, by the processor, a forward filter to the image to generate an intermediate image and flipping the intermediate image. The video processing method may further include applying, by the processor, an inverse filter to the flipped intermediate image to generate a reconstructed image, and inversely flipping the reconstructed image to generate an invertible reconstructed image.

20 Claims, 15 Drawing Sheets

Related U.S. Application Data

(60) Provisional application No. 63/283,602, filed on Nov. 29, 2021.

(56) References Cited

U.S. PATENT DOCUMENTS

| | | | | |
|---|---|---|---|---|
| 2005/0070799 | A1* | 3/2005 | Vilkomerson | A61B 5/6876 600/454 |
| 2011/0286530 | A1 | 11/2011 | Tian et al. | |
| 2014/0146891 | A1 | 5/2014 | Chuang et al. | |
| 2019/0238811 | A1* | 8/2019 | Xiu | H04N 9/78 |
| 2021/0227243 | A1* | 7/2021 | Wu | H04N 19/176 |

OTHER PUBLICATIONS

International Search Report and Written Opinion in related PCT Application No. PCT/US2022/051136 dated Mar. 30, 2023 (9 pages).

Yan et al., "Invertibility-Driven Interpolation Filter for Video Coding", IEEE Transactions on Image Processing, vol. 28, No. 10, pp. 4912-4925, Oct. 2019, pp. 4912-4917; and figure 3.

Extended European Search Report in related European Application No. EP22899448.9 dated Sep. 19, 2025 (11 pages).

Meng X et al: "Non-local Structure-based Filter with integer operation", 122. MPEG Meeting; Apr. 16, 2018-Apr. 20, 2018; San Diego; (Motion Picture Expert Group or ISO/IEC JTC1/SC29/WG11), No. m42414 Apr. 3, 2018 (Apr. 3, 2018), XP030261390, Retrieved from the Internet: URL:http://phenix.int-evry.fr/mpeg/doc_end_user/documents/ 122_San%20Diego/wg11/ m42414-JVET-J0071-v1-JVET-J0077.zip JVET-J0077.docx [retrieved on Apr. 3, 2018].

\* cited by examiner

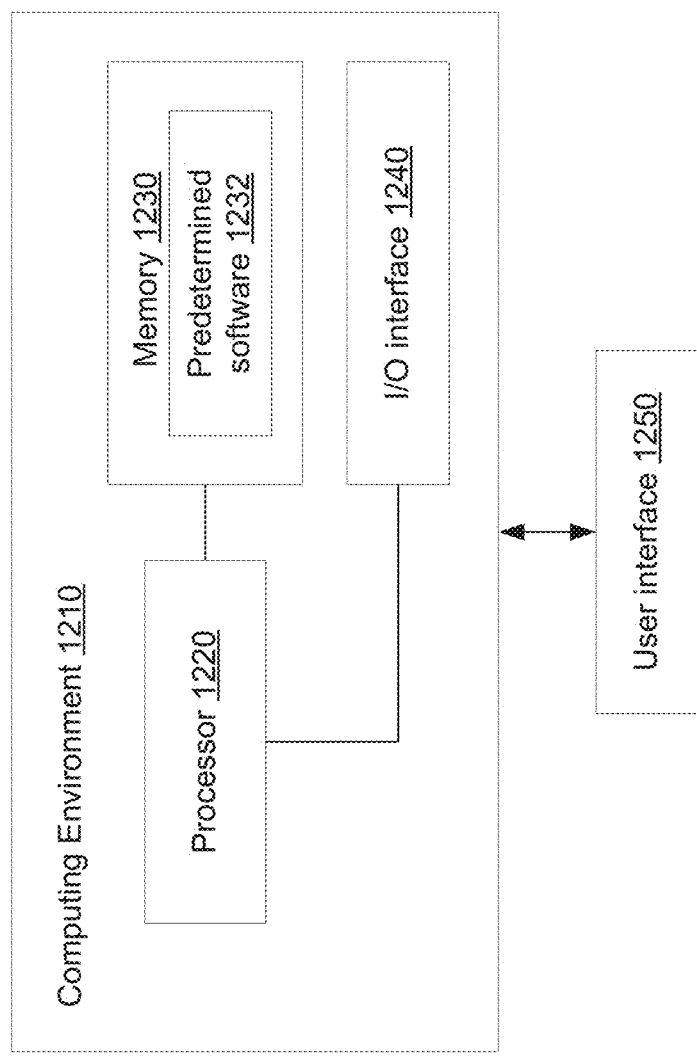

INVERTIBLE FILTERING FOR VIDEO CODING

CROSS-REFERENCE TO RELATED APPLICATIONS

This application is a continuation of PCT Application No. PCT/US2022/051136, filed Nov. 29, 2022, which is based upon and claims priority to U.S. Provisional Application No. 63/283,602, filed Nov. 29, 2021, the content thereof is incorporated herein by reference in its entirety.

TECHNICAL FIELD

This application is related to video coding and compression. More specifically, this application relates to video processing apparatuses and methods for invertible filtering in video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

Implementations of the present disclosure provide a video processing method for invertible filtering in video coding. The video processing method may include receiving, by a processor, an image derived from encoded video information stored in a bitstream. The video processing method may also include applying, by the processor, a forward filter to the image to generate an intermediate image and flipping the intermediate image. The video processing method may further include applying, by the processor, an inverse filter to the flipped intermediate image to generate a reconstructed image, and inversely flipping the reconstructed image to generate an invertible reconstructed image.

Implementations of the present disclosure also provide a video processing apparatus for performing invertible filtering in video coding. The video processing apparatus may include a memory configured to store a coded video frame of a video and a processor coupled to the memory. The processors may be configured to apply a forward filter to an image derived from encoded video information stored in a bitstream to generate an intermediate image and flip the intermediate image. The processor may be further configured to apply an inverse filter to the flipped intermediate image to generate a reconstructed image and inversely flip the reconstructed image to generate an invertible reconstructed image.

Implementations of the present disclosure also provide a non-transitory computer-readable storage medium having stored therein instructions which, when executed by one or more processors, cause the one or more processors to receive a bitstream and perform a video processing method for invertible filtering in video coding. The video processing method may also include receiving an image derived from encoded video information stored in the bitstream. The video processing method may further include applying a forward filter to the image to generate an intermediate image and flipping the intermediate image. The video processing method may also include applying an inverse filter to the flipped intermediate image to generate a reconstructed image, and inversely flipping the reconstructed image to generate an invertible reconstructed image. The bitstream is stored in the non-transitory computer-readable storage medium.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 5 is an illustration of two exemplary Adaptive Loop Filter (ALF) shapes in accordance with some examples.

FIG. 6 is an illustration of a subsampled one-dimensional (1-D) Laplacian calculation in accordance with some examples.

FIG. 12 is a block diagram illustrating a computing environment coupled with a user interface in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

Figure 1:
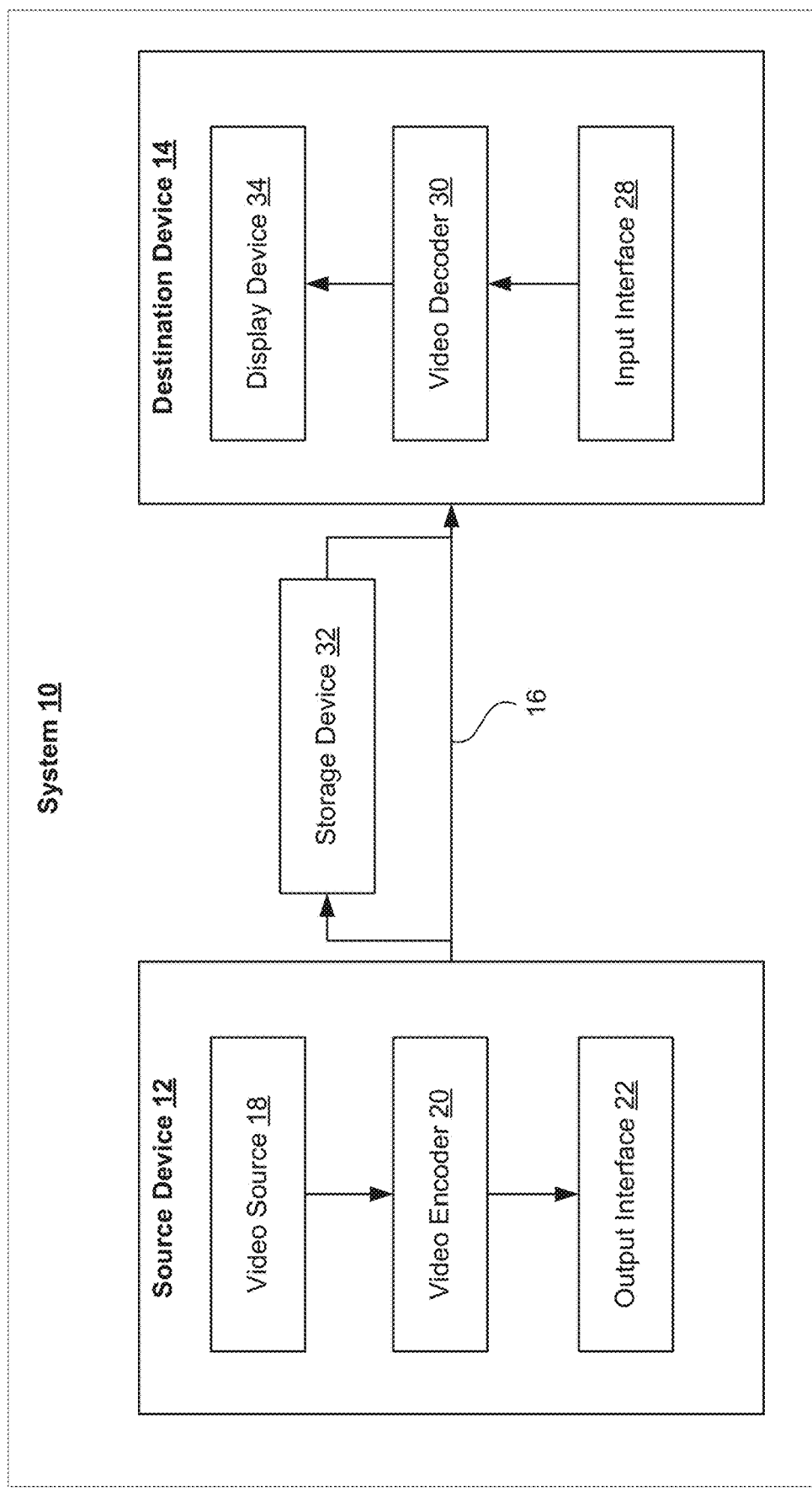
FIG. 1 is a block diagram illustrating an exemplary system for encoding and decoding video blocks in accordance with some implementations of the present disclosure.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of forwarding the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may store the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or any combination thereof that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20, and the output interface 22. The video source 18 may include a source such as a video capturing device, e.g., a video camera, a video archive containing previously captured video, a video feeding interface to receive video data from a video content provider, and/or a computer graphics system for generating computer graphics data as the source video, or a combination of such sources. As one example, if the video source 18 is a video camera of a security surveillance system, the source device 12 and the destination device 14 may include camera phones or video phones. However, the implementations described in the present disclosure may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data for a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present disclosure is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
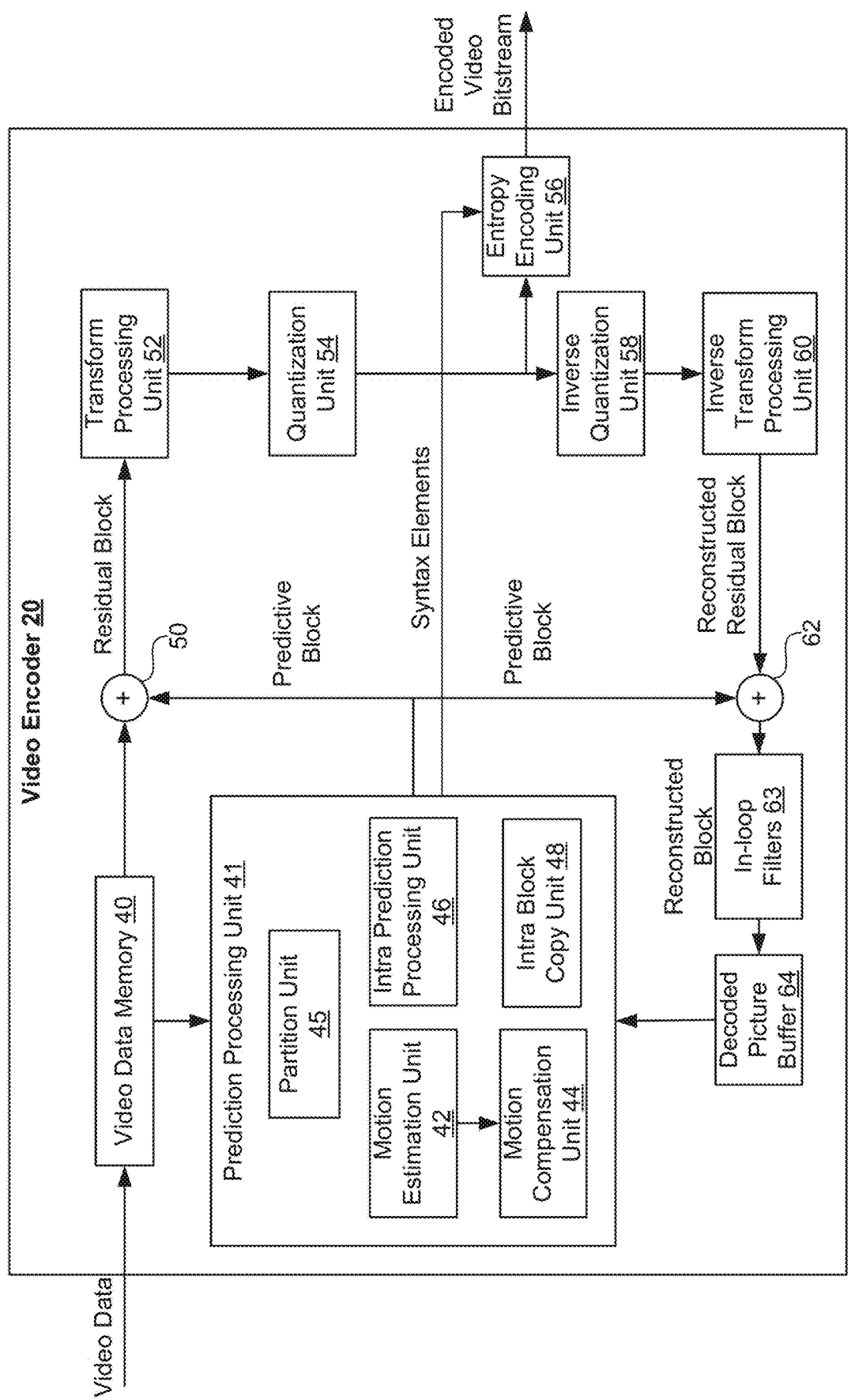
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove block artifacts from reconstructed video data. Another in-loop filter, such as an SAO filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning, Triple-Tree (TT) partitioning or any combination thereof. It should be noted that the term "block" or "video block" as used herein may be a portion, in particular a rectangular (square or non-square) portion, of a frame or a picture. With reference to, for example, HEVC and VVC, the block or video block may be or correspond to a Coding Tree Unit (CTU), a CU, a Prediction Unit (PU), or a Transform Unit (TU), and/or may be or correspond to a corresponding block, e.g., a Coding Tree Block (CTB), a Coding Block (CB), a Prediction Block (PB), or a Transform Block (TB). Alternatively or additionally, the block or video block may be or correspond to a sub-block of a CTB, a CB, a PB, a TB, etc.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block (e.g., a predictive block) to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference frame, according to a predetermined pattern within a sequence of video frames. Motion estimation, performed by the motion estimation unit 42, may be a process of generating motion vectors, which may estimate motion for video blocks. A motion vector, for example, may indicate the displacement of a video block within a current video frame or picture relative to a predictive block within a reference frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vectors.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual block of pixel difference values by subtracting pixel values of the predictive block provided by the motion compensation unit 44 from the pixel values of the current video block being coded. The pixel difference values forming the residual block may include luma or chroma component differences or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. It is noted that the motion estimation unit 42 and the motion compensation unit 44 may be integrated together, which are illustrated separately for conceptual purposes in FIG. 2.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or from a different frame according to inter prediction, the video encoder 20 may form a residual block by subtracting pixel values of the predictive block from the pixel values of the current video block being coded, forming pixel difference values. The pixel difference values forming the residual block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. For example, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in a bitstream.

After the prediction processing unit 41 determines the predictive block for the current video block via either inter prediction or intra prediction, the summer 50 forms a residual block by subtracting the predictive block from the current video block. The residual video data in the residual block may be included in one or more TUs and is provided to the transform processing unit 52. The transform processing unit 52 transforms the residual video data into transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 may use an entropy encoding technique to encode the quantized transform coefficients into a video bitstream, e.g., using Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding, or another entropy encoding methodology or technique. The encoded bitstream may then be transmitted to the video decoder 30 as shown in FIG. 1 or archived in the storage device 32 as shown in FIG. 1 for later transmission to or retrieval by the video decoder 30. The entropy encoding unit 56 may also use an entropy encoding technique to encode the motion vectors and the other syntax elements for the current video frame being coded.

The inverse quantization unit 58 and the inverse transform processing unit 60 apply inverse quantization and inverse transformation, respectively, to reconstruct the residual block in the pixel domain for generating a reference block for prediction of other video blocks. A reconstructed residual block may be generated thereof. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42, and the motion compensation unit 44 as a predictive block to inter predict another video block in a subsequent video frame.

Figure 3:
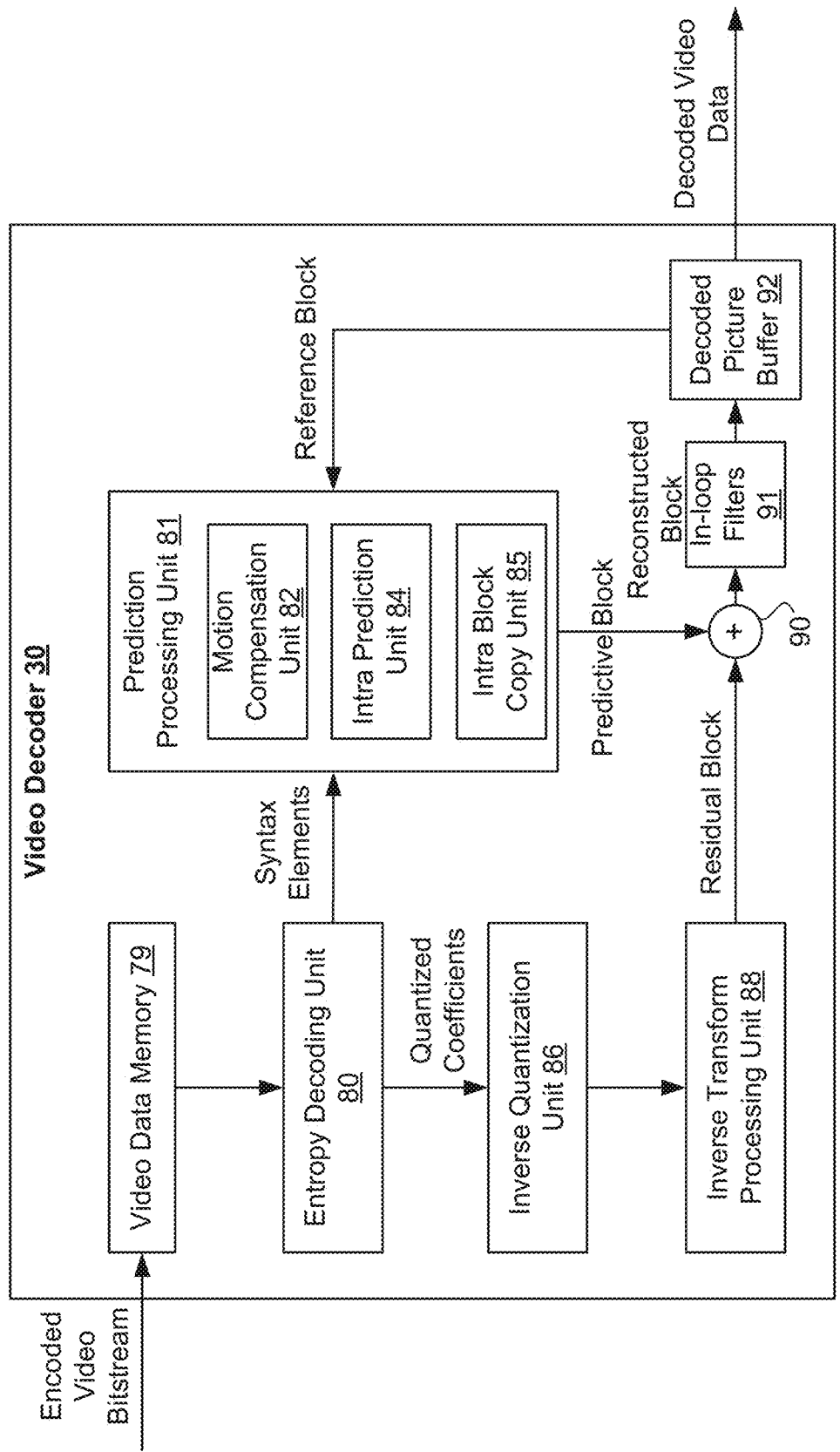
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 may use an entropy decoding technique to decode the bitstream to obtain quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (e.g., I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, e.g., List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block processed by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inversely quantizes the quantized transform coefficients provided in the bitstream and decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs a decoded video block for the current video block by summing the residual block from the inverse transform processing unit 88 and a corresponding predictive block generated by the motion compensation unit 82 and the intra BC unit 85. The decoded video block may also be referred to as a reconstructed block for the current video block. An in-loop filter 91 such as a deblocking filter, SAO filter, and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process (e.g., including a video encoding process and a video decoding process), a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
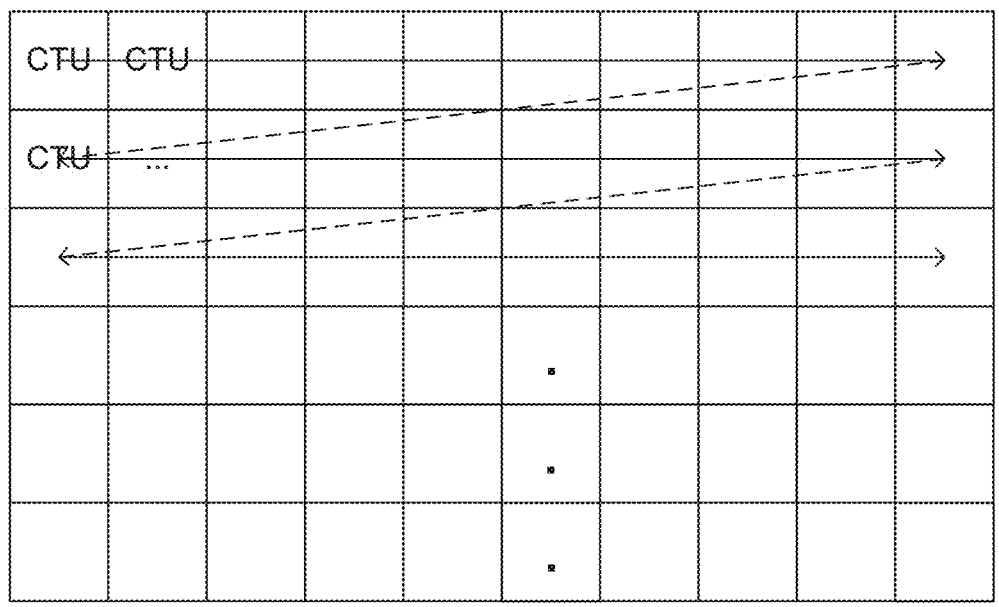
FIGS. 4A through 4E are graphical representations illustrating how a frame is recursively partitioned into multiple video blocks of different sizes and shapes in accordance with some implementations of the present disclosure.
Figure 4B:
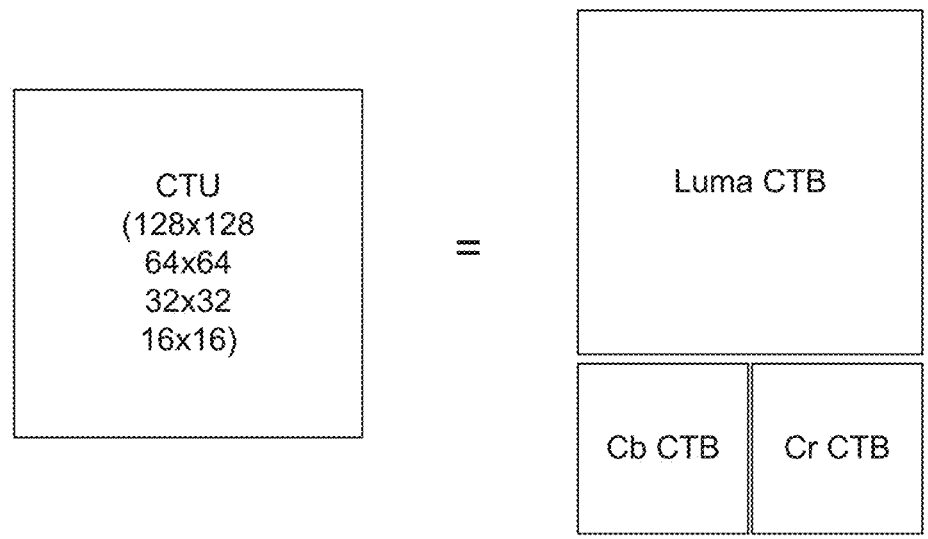

As shown in FIG. 4A, the video encoder 20 (or more specifically the partition unit 45) generates an encoded representation of a frame by first partitioning the frame into a set of CTUs. A video frame may include an integer number of CTUs arranged consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that a CTU in the present disclosure is not necessarily limited to a particular size. As shown in FIG. 4B, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may include a single coding tree block and syntax elements used to code the samples of the coding tree block. A coding tree block may be an N×N block of samples.

Figure 4C:
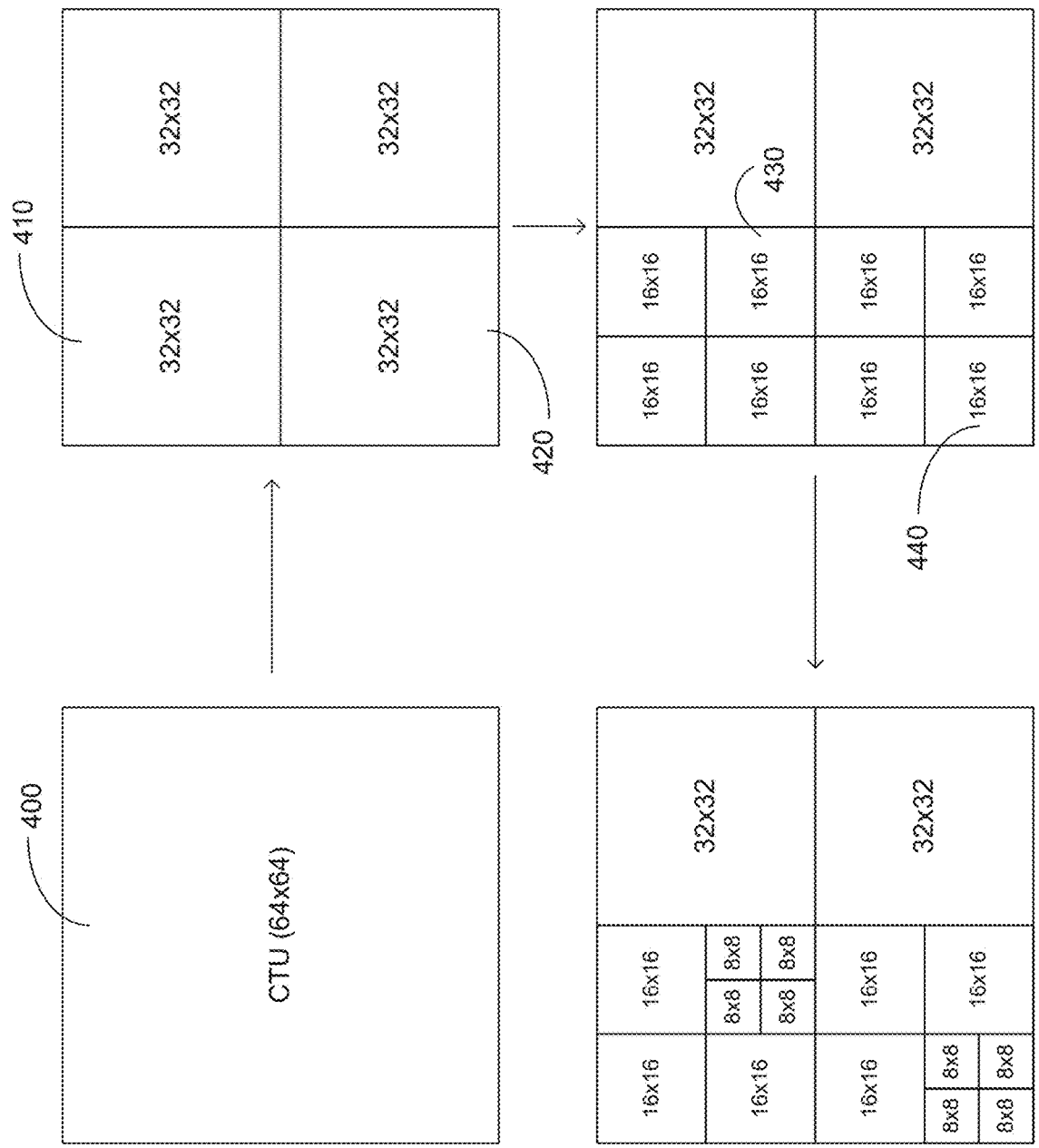
Figure 4D:
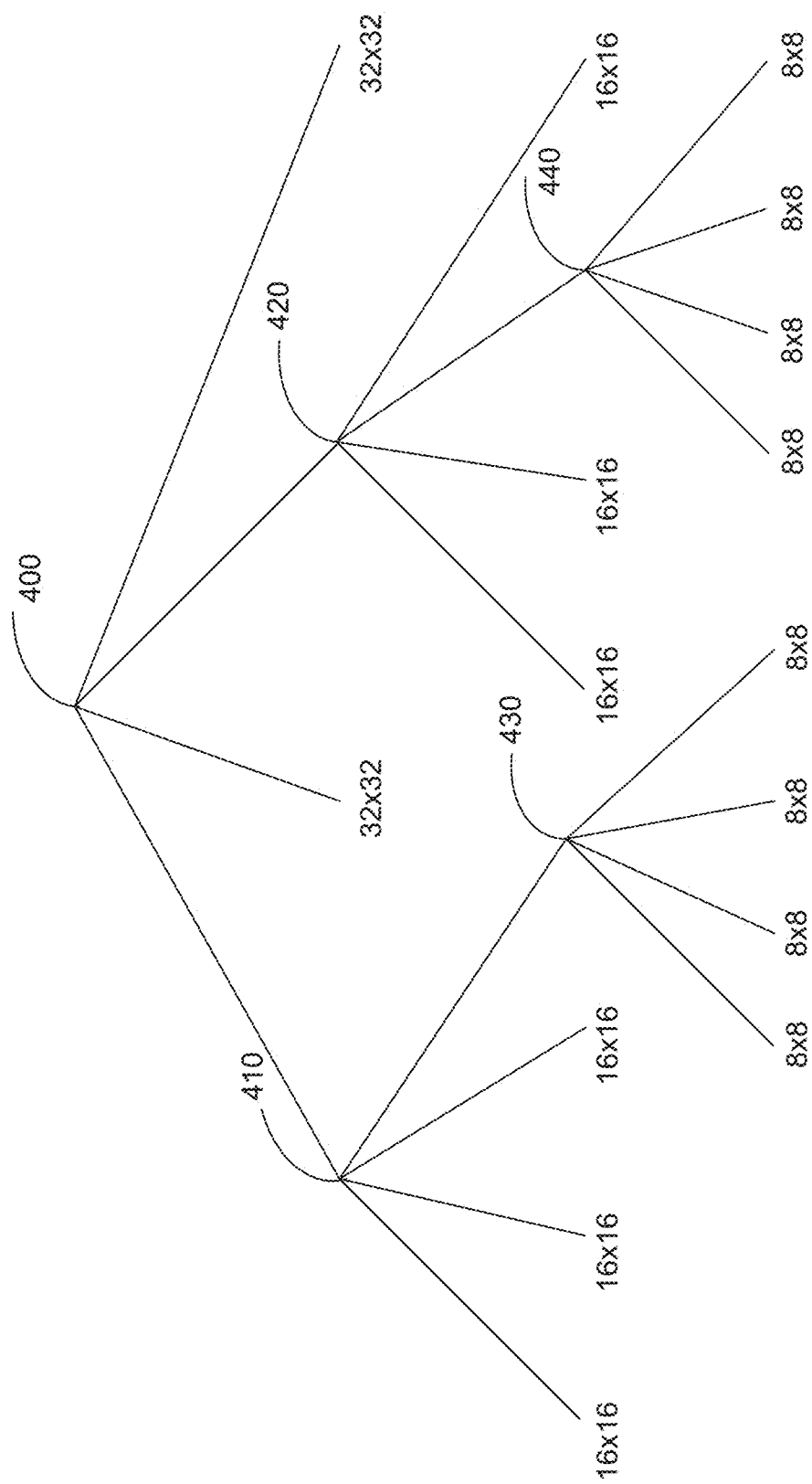
Figure 4E:
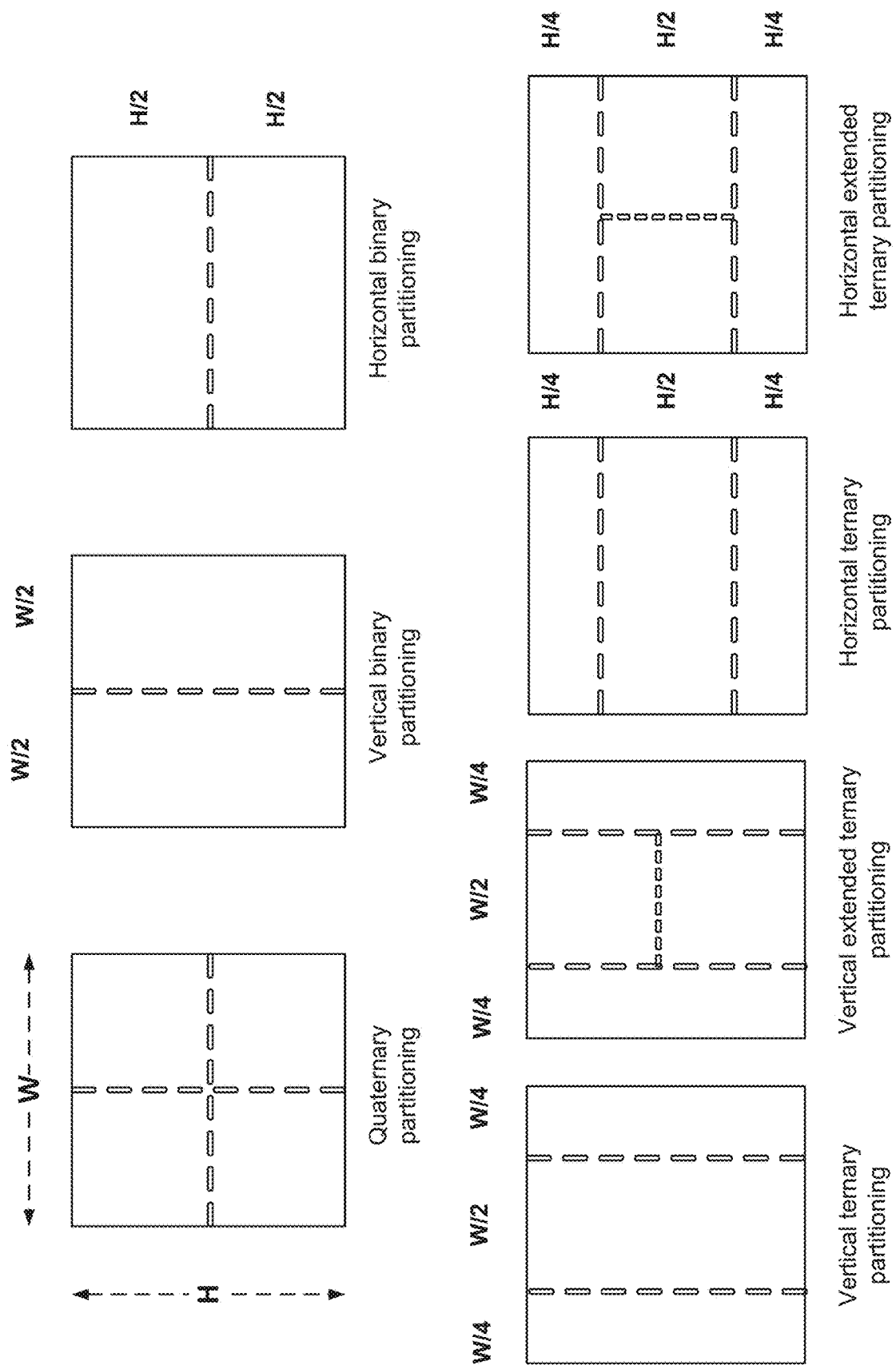

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may include a CB of luma samples and two corresponding coding blocks of chroma samples of a frame of the same size, and syntax elements used to code the samples of the coding blocks. In monochrome pictures or pictures having three separate colour planes, a CU may include a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are multiple possible partitioning types of a coding block having a width W and a height H, i.e., quaternary partitioning, vertical binary partitioning, horizontal binary partitioning, vertical ternary partitioning, vertical extended ternary partitioning, horizontal ternary partitioning, and horizontal extended ternary partitioning.

In some implementations, the video encoder 20 may further partition a coding block of a CU into one or more M×N PBs. A PB may include a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block, and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block may include a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may apply an entropy encoding technique to encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that form a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that intra block copy (IBC) could be regarded as either intra-frame prediction or a third mode. Between the two modes, inter-frame prediction contributes more to the coding efficiency than intra-frame prediction because of the use of motion vectors for predicting a current video block from a reference video block.

But with the ever-improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding an actual motion vector of the current CU into the video bitstream (e.g., the actual motion vector being determined by the motion estimation unit 42 as described above in connection with FIG. 2), the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream, and the amount of data used for representing motion information in the video bitstream can be significantly decreased.

Like the process of choosing a predictive block in a reference frame during inter-frame prediction of a code block, a set of rules can be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30, and an index of the selected motion vector predictor within the motion vector candidate list is sufficient for the video encoder 20 and the video decoder 30 to use the same motion vector predictor within the motion vector candidate list for encoding and decoding the current CU. Thus, only the index of the selected motion vector predictor needs to be sent from the video encoder 20 to the video decoder 30.

The filtering techniques used in video coding can be roughly divided into two categories: supervised filtering and unsupervised filtering. In supervised filtering, the original signal is essential to derive the filter coefficients, while in the unsupervised filtering, the original signal is not needed. Among these filtering techniques, Sample Adaptive Offset (SAO), Adaptive Loop Filter (ALF) and signal adaptive diffusion filter belong to supervised filtering technique, while deblocking filter, bilateral filter and Non-Local Structure-based Filter (NLSF) belong to the unsupervised filtering technique.

Deblocking filtering process is similar to those in HEVC. In VVC, the deblocking filtering process is applied on a CU boundaries, transform subblock boundaries and prediction subblock boundaries. The prediction subblock boundaries include the prediction unit boundaries introduced by the SbTMVP and affine modes, and the transform subblock boundaries include the transform unit boundaries introduced by SBT and ISP modes, and transforms due to implicit split of large CUs. As done in HEVC, the processing order of the deblocking filter is defined as horizontal filtering for vertical edges for the entire picture first, followed by vertical filtering for horizontal edges. This specific order enables either multiple horizontal filtering or vertical filtering processes to be applied in parallel threads, or can still be implemented on a CTB-by-CTB basis with only a small processing latency.

Compared to HEVC deblocking, the following modifications are introduced to the VVC deblocking: (1) The filter strength of the deblocking filter dependent of the averaged luma level of the reconstructed samples; (2) deblocking tC table extension and adaptation to 10-bit video; (3) 4×4 grid deblocking for luma; (4) stronger deblocking filter for luma; (5) stronger deblocking filter for chroma; (6) deblocking filter for subblock boundary; (7) deblocking decision adapted to smaller difference in motion.

In VVC, SAO technique is inherited from HEVC. SAO may use different offsets sample by sample in a region depending on the sample classification, and SAO parameters are adapted from region to region. Two SAO types that can satisfy the requirements of low complexity are adopted in HEVC: edge offset (EO) and band offset (BO). For EO, the sample classification is based on comparison between current samples and neighboring samples. For BO, the sample classification is based on sample values. Please note that each color component may have its own SAO parameters. To achieve low encoding latency and to reduce the buffer requirement, the region size is fixed to one CTB. To reduce side information, multiple CTUs can be merged together to share SAO parameters.

Figure 5:
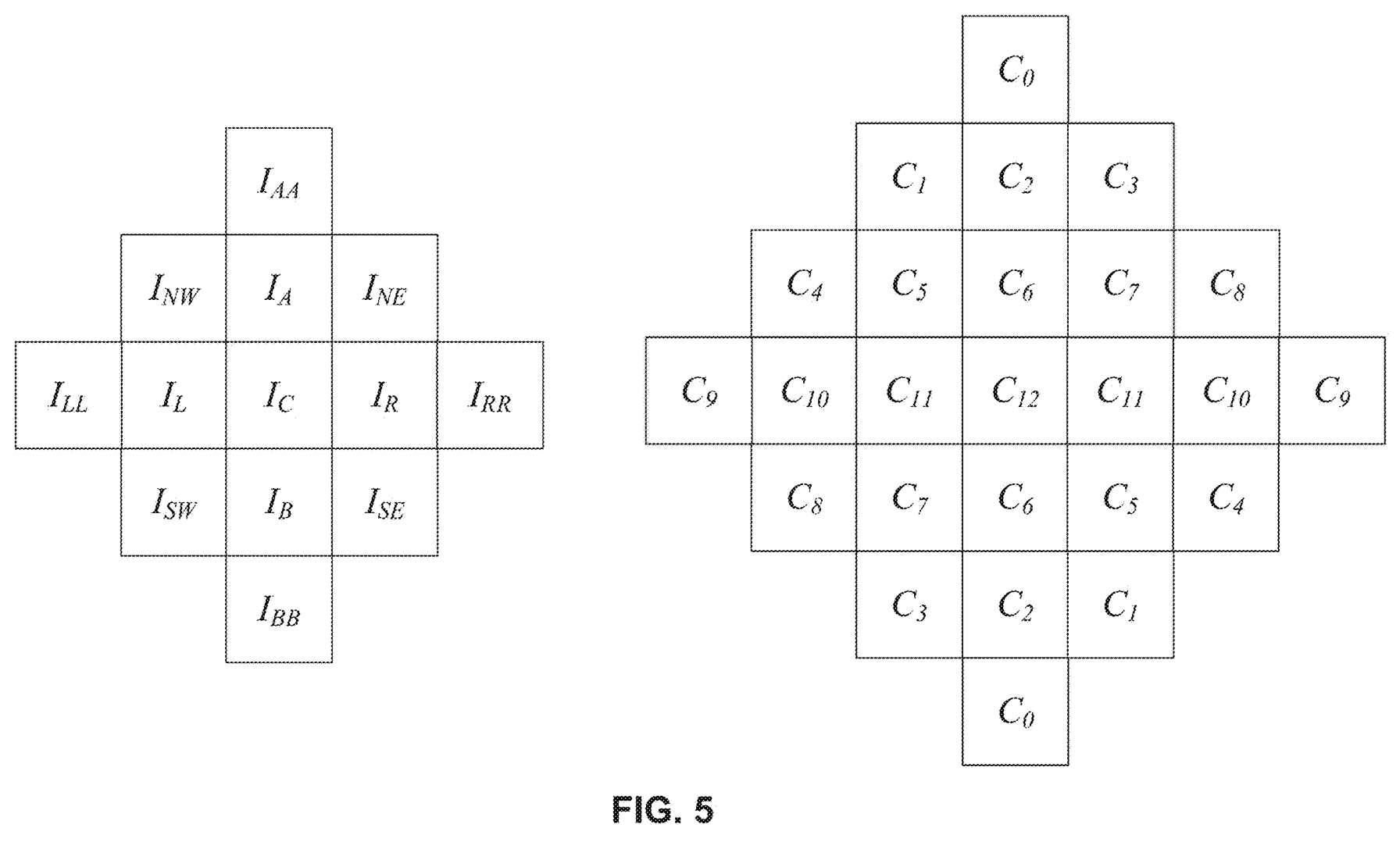

In VVC, an ALF with block-based filter adaption is applied. For the luma component, one among 25 filters is selected for each 4×4 block, based on the direction and activity of local gradients. FIG. 5 is an illustration of two exemplary Adaptive Loop Filter (ALF) shapes in accordance with some examples. As shown in FIG. 5, two diamond filter shapes can be used. In some implementations, the 5×5 diamond shape (left) can be applied for chroma components and the 7×7 diamond shape (right) can be applied for luma component.

In some implementations, for a luma component, each 4×4 block is categorized into one out of 25 classes. The classification index C is derived based on its directionality D and a quantized value of activity Â, e.g., according to Equation (1):

$$C = 5D + \hat{A} \quad (1)$$

To calculate D and Â, gradients of the horizontal, vertical and two diagonal directions are first calculated using 1-D Laplacian, e.g., according to Equations (2)-(5):

$$g_v = \sum_{k=i-2}^{i+3}\sum_{l=j-2}^{j+3} V_{k,l}, \; V_{k,l} = |2R(k, l) - R(k, l-1) - R(k, l+1)| \quad (2)$$

$$g_h = \sum_{k=i-2}^{i+3}\sum_{l=j-2}^{j+3} H_{k,l}, \; H_{k,l} = |2R(k, l) - R(k-1, l) - R(k+1, l)| \quad (3)$$

$$g_{d1} = \sum_{k=i-2}^{i+3}\sum_{l=j-3}^{j+3} D1_{k,l}, \quad (4)$$

$$D1_{k,l} = |2R(k, l) - R(k-1, l-1) - R(k+1, l+1)|$$

$$g_{d2} = \sum_{k=i-2}^{i+3}\sum_{j=j-2}^{j+3} D2_{k,l}, \quad (5)$$

$$D2_{k,l} = |2R(k, l) - R(k-1, l+1) - R(k+1, l-1)|.$$

In Equations (2)-(5), indices i and j refer to the coordinates of the upper left sample within the 4×4 block and R(i, j) indicate a reconstructed sample at coordinate (i, j).

Figure 6:
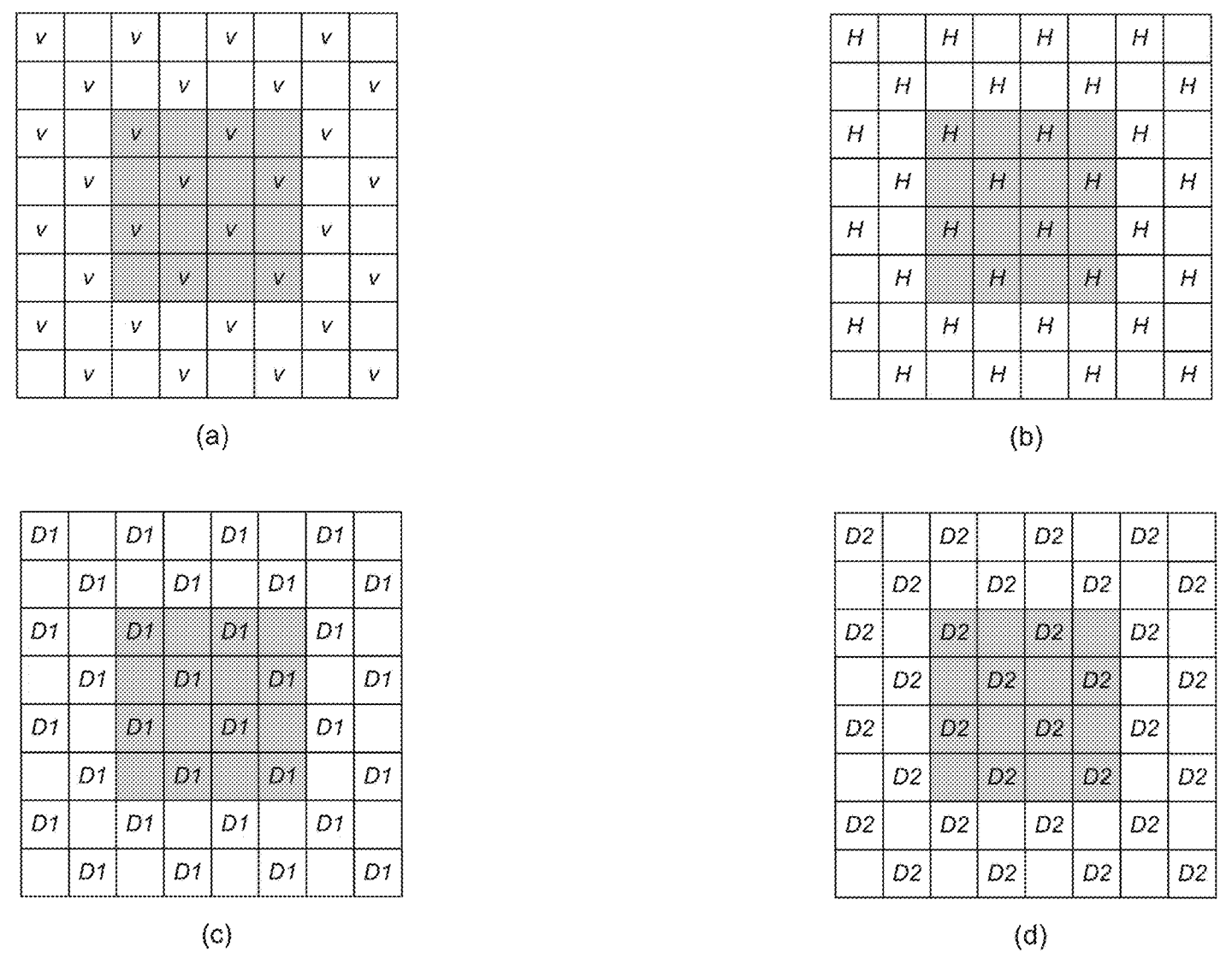

To reduce the complexity of block classification, the subsampled 1-D Laplacian calculation is applied. FIG. 6 is an illustration of a subsampled one-dimensional (1-D) Laplacian calculation in accordance with some examples. As shown in FIG. 6, the same subsampled positions can be used for gradient calculation of all directions. For example, part (a) of FIG. 6 shows subsampled positions for vertical gradient, Part (b) of FIG. 6 shows the subsampled positions for horizontal gradient, Part (c) of FIG. 6 shows the subsampled positions for a first diagonal gradient, and Part (d) of FIG. 6 shows the subsampled positions for a second diagonal gradient.

Then maximum and minimum values of the gradients of horizontal and vertical directions can be set, e.g., according to Equation (6):

$$g_{h,v}^{max} = \max(g_h, g_v), \quad g_{h,v}^{min} = \min(g_h, g_v) \quad (6)$$

The maximum and minimum values of the gradient of two diagonal directions can be set, e.g., according to Equation (7):

$$g_{d0,d1}^{max} = \max(g_{d0}, g_{d1}), \quad g_{d0,d1}^{min} = \min(g_{d0}, g_{d1}) \quad (7)$$

To derive the value of the directionality D, these values can be compared against each other and with two thresholds $t_1$ and $t_2$. In some implementations, the value of the directionality D is derived according to the following steps:

Step 1. If both $g_{h,v}^{max} \leq t_1 \cdot g_{h,v}^{min}$ in and $g_{d0,d1}^{max} \leq t_1 \cdot d_{d0,d1}^{min}$ are true, D is set to 0.

Step 2. If $g_{h,v}^{max}/g_{h,v}^{min} > g_{d0,d1}^{max}/g_{d0,d1}^{min}$ continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated, e.g., according to Equation (8):

$$A = \sum_{k=i-2}^{i+3} \sum_{l=j-2}^{j+3} (V_{k,l} + H_{k,l}) \quad (8)$$

where A is further quantized to the range of 0 to 4, inclusively, and the quantized value is denoted as Â.

In some implementations, before filtering each 4×4 luma block, geometric transformations such as rotation or diagonal and vertical flipping can be applied to the filter coefficients $f(k, l)$ and to the corresponding filter clipping values $c(k, l)$ depending on gradient values calculated for that block. This is equivalent to applying these transformations to the samples in the filter support region. Accordingly, different blocks to which ALF is applied are more similar by aligning their directionality.

In some implementations, geometric transformations, including diagonal, vertical flip and rotation can be performed, e.g., according to Equation s (9)-(11):

$$\text{Diagonal: } f_D(k, l) = f(l, k), \, c_D(k, l) = c(l, k), \quad (9)$$

$$\text{Vertical flip: } f_V(k, l) = f(k, K - l - 1), \, c_V(k, l) = c(k, K - l - 1) \quad (10)$$

$$\text{Rotation: } f_R(k, l) = f(K - l - 1, k), \, c_R(k, l) = c(K - l - 1, k) \quad (11)$$

where K is the size of the filter and $0 \leq k$, $l \leq K-1$ are coefficients coordinates, such that location (0,0) is at the upper left corner and location (K-1, K-1) is at the lower right corner. The transformations are applied to the filter coefficients f (k, l) and to the clipping values c(k, l) depending on gradient values calculated for that block.

The relationship between the transformation and the four gradients of the four directions are summarized in the Table 1. Table 1 shows a mapping of the gradient calculated for one block and the transformations.

TABLE 1

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

In some implementation, at the decoder side, when ALF is enabled for a CTB, each sample R(i, j) within the CU is filtered, resulting in sample value R'(i, j), e.g., according to Equation (12):

$$R'(i, j) = R(i, j) + \quad (12)$$
$$\left( \left( \sum_{k \neq 0} \sum_{l \neq 0} f(k, l) \times K(R(i + k, j + l) - R(i, j), c(k, l)) + 64 \right) \gg 7 \right)$$

where $f(k, l)$ denotes the decoded filter coefficients, K(x, y) is the clipping function and c(k, l) denotes the decoded clipping parameters. The variable k and l vary between -L/2 and L/2 where L denotes the filter length. The clipping function K(x, y)=min(y, max(-y, x)) which corresponds to the function Clip3 (-y, y, x). The clipping operation introduces non-linearity to make ALF more efficient by reducing the impact of neighbor sample values that are too different with the current sample value.

Bilateral filtering is a filtering technique used in video coding. For a filter kernel of the bilateral filtering, the contribution of each sample in a video block depends not only on spatial distances between the samples, but also on the difference in the intensities between the samples. A sample located at a position (i, j) may be filtered using its neighboring sample at a position (k, l) within a filtering window, where the sample (i, j) is a center sample of the filtering window. A weight ω(i, j, k, l) assigned to the sample (k, l) for the filtering of the sample (i, j) can be expressed in the following Equation (13):

$$\omega(i, j, k, l) = e^{-\frac{(i-k)^2 + (j-l)^2}{2\sigma_d^2} - \frac{(I(i,j) - I(k,l))^2}{2\sigma_r^2}} \quad (13)$$

In the above Equation (13), I(i, j) and I(k, l) denotes intensity values of the samples (i, j) and (k, l), respectively.

The strength of the bilateral filter is controlled by $\sigma_d$ (representing a spatial strength) and $\sigma_r$ (representing an intensity strength). An output sample (e.g., an output filtered sample for the center sample (i, j)) can be a weighted average of the samples inside the filtering window (e.g., with the weights being determined based on the above equation (13), respectively).

In an Enhanced Compression Model (ECM), there can be three in-loop filtering modules, including a de-blocking filter (DBF), a sample adaptive offset (SAO), and an adaptive loop filter (ALF). For VVC standard, a bilateral filter can be used to refine a reconstructed block after an inverse transform. Later, the application of the bilateral filter is extended to be a part of the in-loop filtering, which can be utilized with SAO jointly as shown in the following Equation (14). The bilateral filter creates a bilateral filtering offset per sample, which is added to the corresponding input sample of the bilateral filter, and then clipped before proceeding to the ALF. For example, an output of the joint bilateral filter and SAO filter can be expressed, e.g., using the Equation (14):

$$I_{OUT} = clip3(I_C + \Delta I_{BIF} + \Delta I_{SAO}). \quad (14)$$

In the above Equation (14), $I_{OUT}$ denotes the output of the joint bilateral filter and SAO filter, which is also denoted as a filtered sample used as an input for subsequent ALF. $I_C$ denotes an intensity of the center sample, which is also the input sample of the bilateral filter received from the de-blocking filter. $\Delta I_{BIF}$ denotes the bilateral filtering offset. $\Delta I_{SAO}$ denotes an offset value produced by the SAO filter. clip3(•) denotes a clipping function to make sure that the output is in the range of [minValue, maxValue], which is expressed in the following Equation (15):

$$clip3(x) = \min(\max(\min Value, x), \max Value). \quad (15)$$

The implementation of bilateral filtering in the ECM provides the possibility for a video encoder to enable or disable the filtering at the CTU level and/or the slice level. The video encoder makes the decision by evaluating a rate-distortion optimization (RDO) cost. The following Table 2, Table 3, and Table 4 provide a picture parameter set (PPS) raw byte sequence payload (RBSP) syntax, a slice header syntax, and a coding tree unit syntax for a bilateral filter, respectively.

TABLE 2

PPS RBSP syntax for bilateral filter

| | Descriptor |
| --- | --- |
| pic_parameter_set_rbsp( ) { | |
| ... | |
|   pps_bilateral_filter_enabled_flag | u(1) |
|   if( pps_bilateral_filter_enabled_flag) { | |
|     bilateral_filter_strength | u(2) |
|     bilateral_filter_qp_offset | se(v) |
|   } | |

In Table 2, if a parameter pps_bilateral_filter_enabled_flag is equal to 0, it specifies that the bilateral filter is disabled for slices referring to the PPS. If the parameter pps_bilateral_filter_enabled_flag is equal to 1, it specifies that the bilateral filter is enabled for slices referring to the PPS. A parameter bilateral_filter_strength specifies a bilateral filter strength value used in the bilateral transform block filter process. The value of bilateral_filter_strength can be in the range of 0 to 2, inclusive. A parameter bilateral_filter_qp_offset specifies an offset used in the derivation of the bilateral filter look-up table, LUT(x), for slices referring to the PPS. The parameter bilateral_filter_qp_offset can be in the range of −12 to +12, inclusive.

TABLE 3

Slice header syntax for bilateral filter

| | Descriptor |
| --- | --- |
| slice_header( ) { | |
| ... | |
|   if( pps_bilateral_filter_enabled_flag ) { | |
|     slice_bilateral_filter_all_ctb_enabled_flag | u(1) |
|     if( !slice_bilateral_filter_all_ctb_enabled_flag ) | |
|       slice_bilateral_filter_enabled_flag | u(1) |
|   } | |

In Table 3, if a parameter slice_bilateral_filter_all_ctb_enabled_flag is equal to 1, it specifies that the bilateral filter is enabled and is applied to all CTBs in the current slice. When slice_bilateral_filter_all_ctb_enabled_flag is not present, it is inferred to be equal to 0. If a parameter slice_bilateral_filter_enabled_flag is equal to 1, it specifies that the bilateral filter is enabled and may be applied to CTBs of the current slice. When slice_bilateral_filter_enabled_flag is not present, it is inferred to be equal to slice_bilateral_filter_all_ctb_enabled_flag.

TABLE 4

Coding tree unit syntax for bilateral filter

| | Descriptor |
| --- | --- |
| coding_tree_unit( ) { | |
| ... | |
|   if( !slice_bilateral_filter_all_ctb_enabled_flag && | |
|   slice_bilateral_filter_enabled_flag ) | |
|     bilateral_filter_ctb_flag[ xCtb >> CtbLog2SizeY ][ yCtb >> CtbLog2SizeY ] | u(1) |

In Table 4, if bilateral_filter_ctb_flag [xCtb>>CtbLog2SizeY][yCtb>>CtbLog2SizeY] is equal to 1, it specifies that the bilateral filter is applied to the luma coding tree block of the coding tree unit at luma location (xCtb, yCtb). If bilateral_filter_ctb_flag [xCtb>>CtbLog2SizeY][yCtb>>CtbLog2SizeY] is equal to 0, it specifies that the bilateral filter is not applied to the luma coding tree block of the coding tree unit at luma location (xCtb, yCtb). When bilateral_filter_ctb_flag is not present, it is inferred to be equal to (slice_bilateral_filter_all_ctb_enabled_flag & slice_bilateral_filter_enabled_flag).

A bilateral filtering process for a video block (e.g., a CTU) can proceed as follows. At a picture border where samples are unavailable, a bilateral filter may use extension (e.g., sample repetition) to fill in the unavailable samples. For virtual boundaries, behavior like that of SAO can be performed, i.e., no filtering occurs. When crossing horizontal CTU borders, the bilateral filter can access samples like those of the SAO filtering. Using the 5×5 filter shape shown in FIG. 5 as an example, if a center sample $I_C$ is located on the top line of a current CTU, then $I_{NW}$, $I_A$, and $I_{NE}$ can be read from another CTU that is above the current CTU (e.g., just like what SAO filtering does), but $I_{AA}$ can be padded. Therefore, no extra line buffer is needed.

The samples surrounding the center sample $I_C$ inside the filter window can be referred to as neighboring samples of the center sample, and can be denoted according to FIG. 4E, where A, B, L, and R stand for above, below, left, and right, respectively, and NW, NE, SW, and SE stand for northwest, northeast, southwest, and southeast, respectively. Likewise, AA stands for above-above, BB stands for below-below, LL stands for left-left, and RR stands for right-right.

Each neighboring sample (e.g., $I_A$, $I_R$, etc.) that is one step away from the center sample $I_C$ may contribute to a corresponding modifier value (e.g., $\mu_{\Delta I_A}$, $\mu_{\Delta I_R}$, etc.), which can be calculated as follows. For instance, by taking a right neighboring sample $I_R$ as an example, a difference $\Delta I_R$ between the sample $I_R$ and the center sample $I_C$ can be calculated, e.g., using the Equation (15):

$$\Delta I_R = (|I_R - I_C| + 4) \gg 3. \quad (16)$$

In the above Equation (15), |•| denotes an absolute value, and >> denotes a right shift by 3. The above Equation (15) applies when the data has a 10-bit size. For data that does not have the 10-bit size, the difference $\Delta I_R$ between the sample $I_R$ and the center sample $I_C$ can be calculated, e.g., using Equation (17):

$$\Delta I_R = \left(|I_R - I_C| + 2^{n-6}\right) \gg (n-7). \quad (17)$$

In the above equation (17), n represents the number of the bits (e.g., n=8 for 8-bit data). Then, the difference $\Delta I_R$ can be clipped to obtain a clipped difference $sI_R$ which is smaller than 16, as shown in Equation (18):

$$sI_R = \min(15, \Delta I_R). \quad (18)$$

A modifier value $\mu_{\Delta I_R}$ for the sample $I_R$ can be calculated as shown in Equation (19):

$$\mu_{\Delta I_R} = \begin{cases} LUT_{ROW}[sI_R], & \text{if } I_R - I_C \geq 0, \\ -LUT_{ROW}[sI_R], & \text{otherwise} \end{cases}. \quad (19)$$

In the above Equation (19), $LUT_{ROW}[\ ]$ denotes an LUT which is an array of 16 values determined by a value of qpb=clip(0, 25, QP+bilateral_filter_qp_offset−17).

Similarly, by performing operations like those described above with respect to equations (16)-(19), modifier values $\mu_{\Delta I_L}$, $\mu_{\Delta I_A}$, and $\mu_{\Delta I_B}$ for the left, above, and below neighboring samples $I_L$, $I_A$, and $I_B$ can be calculated from $I_L$, $I_A$ and $I_B$, respectively. The similar description is not repeated herein.

For diagonal samples $I_{NW}$, $I_{NE}$, $I_{SE}$, $I_{SW}$ and the two-steps-away samples $I_{AA}$, $I_{BB}$, $I_{RR}$ and $I_{LL}$ (which are two steps away from the center sample), the calculation of the modifier values also follows the above Equations (16)-(18), with a modification in the above equation (19) by shifting the value by 1. For example, using the diagonal sample $I_{SE}$ as an example, the above equation (19) is modified as shown in Equation (20) for the calculation of the modifier value $\mu_{\Delta I_{SE}}$:

$$\mu_{\Delta I_{SE}} = \begin{cases} LUT_{ROW}[sI_{SE}] \gg 1, & \text{if } I_{SE} - I_C \geq 0, \\ -(LUT_{ROW}[sI_{SE}] \gg 1), & \text{otherwise} \end{cases}. \quad (20)$$

Similarly, the other diagonal samples $I_{NW}$, $I_{NE}$, $I_{SW}$, and the two-steps-away samples $I_{AA}$, $I_{BB}$, $I_{RR}$ and $I_{LL}$ are calculated likewise. Then, the modifier values can be summed together to generate a modifier sum $m_{sum}$ as shown in Equation (21):

$$m_{sum} = \mu_{\Delta I_A} + \mu_{\Delta I_B} + \mu_{\Delta I_L} + \mu_{\Delta I_R} + \mu_{\Delta I_{NW}} + \quad (21)$$
$$\mu_{\Delta I_{NE}} + \mu_{\Delta I_{SW}} + \mu_{\Delta I_{SE}} + \mu_{\Delta I_{AA}} + \mu_{\Delta I_{BB}} + \mu_{\Delta I_{LL}} + \mu_{\Delta I_{RR}}.$$

It is noted that $\mu_{\Delta I_R}$ equals $-\mu_{\Delta I_A}$ for the previous sample. Likewise, $\mu_{\Delta I_A}$ equals $-\mu_{\Delta I_B}$ for the sample above, and similar symmetries can be found also for the diagonal modifier values and the two-steps-away modifier values. This means that in a hardware implementation, it is sufficient to calculate the six modifier values $\mu_{\Delta I_R}$, $\mu_{\Delta I_B}$, $\mu_{\Delta I_{SW}}$, $\mu_{\Delta I_{SE}}$, $\mu_{\Delta I_{RR}}$, and $\mu_{\Delta I_{BB}}$, whereas the remaining six modifier values $\mu_{\Delta I_L}$, $\mu_{\Delta I_A}$, $\mu_{\Delta I_{NW}}$, $\mu_{\Delta I_{NE}}$, $\mu_{\Delta I_{LL}}$, and $\mu_{\Delta I_{AA}}$ can be obtained from previously calculated values.

Next, the modifier sum $m_{sum}$ can be multiplied by a multiplier c (e.g., c=1, 2 or 3), which can be executed using a single adder and logical AND gates as shown in Equation (22):

$$c_v = k_1 \ \&(m_{sum} \ll 1) + k_2 \ \& m_{sum}. \quad (22)$$

In the above Equation (22), & denotes a logical AND operation, $k_1$ is the most significant bit of the multiplier c, and $k_2$ is the least significant bit of the multiplier c. A value of the multiplier c can be obtained using a minimum block dimension D=min(width, height) as shown in the following Table 5.

TABLE 5

| c parameter and the minimum size D = min(width, height) of the block | | | |
|---|---|---|---|
| Block type | D ≤ 4 | 4 < D < 16 | D ≥ 16 |
| Intra | c = 3 | c = 2 | c = 1 |
| Inter | c = 2 | c = 2 | c = 1 |

Subsequently, a bilateral filter offset $\Delta I_{BIF}$ for the center sample $I_C$ can be calculated using Equation (23) for full strength filtering or Equation (24) for half-strength filtering:

$$\Delta I_{BIF} = (c_v + 16) \gg 5, \text{ or} \quad (23)$$
$$\Delta I_{BIF} = (c_v + 32) \gg 6. \quad (24)$$

A general formula to obtain the bilateral filter offset $\Delta I_{BIF}$ for n-bit data can be calculated using Equations (25)-(27):

$$r_{add} = 2^{14-n-bilateral\_filter\_strength}, \quad (25)$$
$$r_{shift} = 15 - n - \text{bilateral\_filter\_strength}, \quad (26)$$
$$\Delta I_{BIF} = (c_v + r_{add}) \gg r_{shift}. \quad (27)$$

In the above Equations (25)-(27), bilateral_filter_strength can be 0 or 1 and is signaled in the PPS.

Diffusion filtering technique can be applied to the prediction signal generated by a hybrid video codec. In some implementations, diffusion filters may be applied to the prediction signal pred generated by the underlying codec. The filter may be applied for intra as well as inter predictions. Two types of diffusion filters can be used, including linear and nonlinear diffusion filters. The linear diffusion filters correlate the extended prediction signal n times using a symmetric filter mask. The nonlinear diffusion filters use the input prediction signal to identify structures of the underlying signal and diffuse along edges rather than perpendicular to them.

The linear diffusion filters may be derived from the following partial differential equation, Equation (28):

$$\frac{\partial}{\partial t} u(x, t) = div(\nabla u(x, t)) \tag{28}$$

where u denotes the filtered prediction and parameter t denotes time which corresponds to iterations in a discrete setting, i.e., u(x, 0)=pred(x). The linear diffusion filters are implemented as a symmetric filter mask as shown in Equation (29):

$$h = \frac{1}{4}\begin{bmatrix} 0 & 1 & 0 \\ 1 & 0 & 1 \\ 0 & 1 & 0 \end{bmatrix} \tag{29}$$

Figure 7:
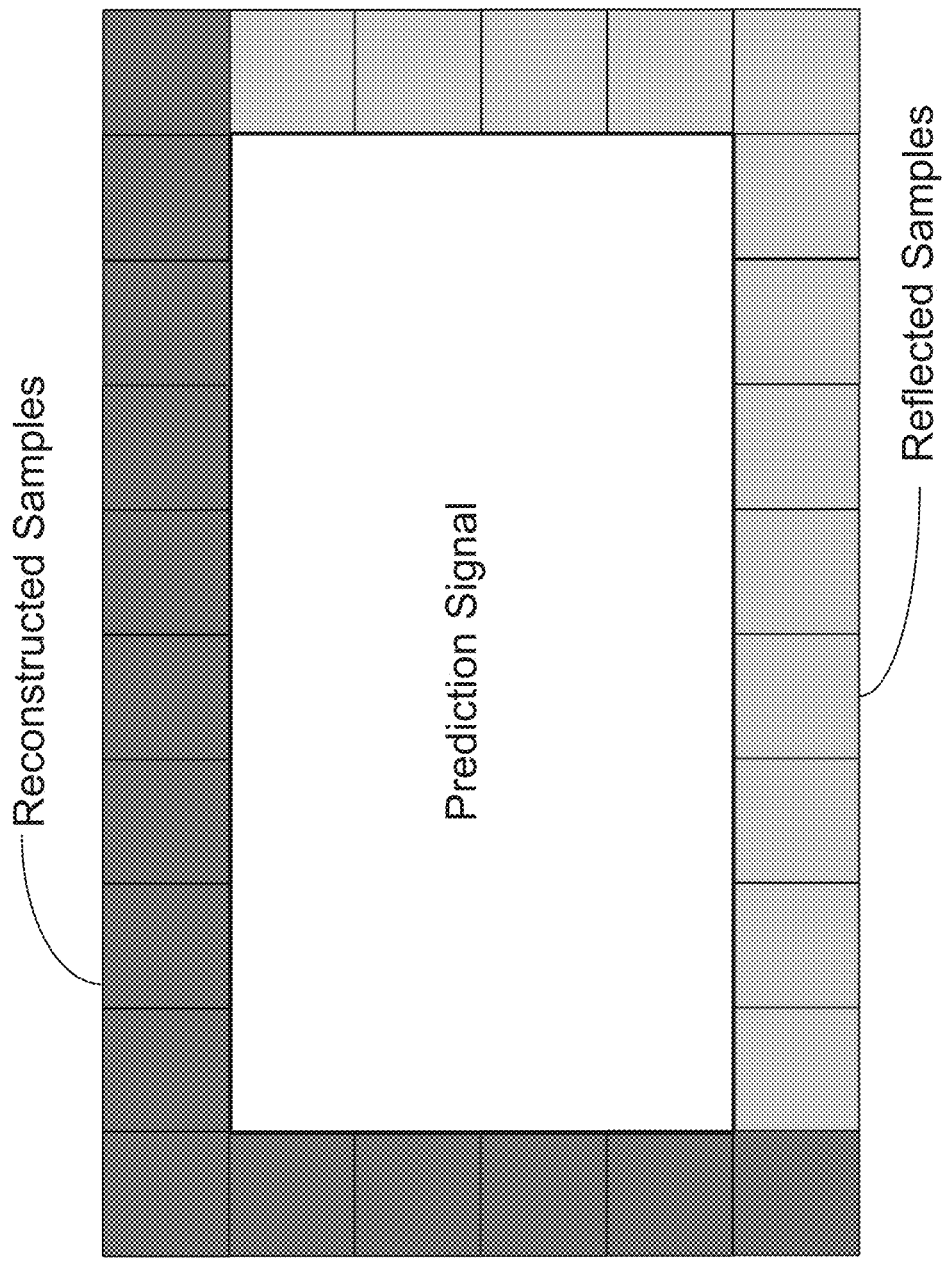
FIG. 7 is an illustration of an exemplary extended prediction signal including a prediction signal, reconstructed samples, and reflected samples in accordance with some examples.

In some implementations, 2D filter masks can be implemented as 1D filters. The filtered prediction $u_n$ can be calculated by correlating n times the prediction signal pred with the filter mask h, i.e., by calculating Equation (30):

$$u_n = \underbrace{h * \ldots * h}_{n \text{ times}} * pred \tag{30}$$

where * denotes the application of the filter mask to the image, also known as correlation. At each correlation step, at the right and lower boundary symmetric boundary conditions are assumed while at the top and left boundary equality with the reconstructed samples is assumed. For example, FIG. 7 is an illustration of an exemplary extended prediction signal including a prediction signal, reconstructed samples, and reflected samples.

In some implementations, the number n of iterations can be equal to 5 or 15 iteration steps, in case of Inter-prediction or equal to 5 or 35 in case of Intra-prediction. The more iteration steps are carried out, the smoother the modified prediction will be. In the end, the filtered prediction is used as the modified prediction block.

On the other hand, nonlinear diffusion filters can be used to locate edges using the given prediction signal and reduce the magnitude of diffusion at those locations. The implementation of the nonlinear diffusion filters can be derived from the following nonlinear differential equation, Equation (31):

$$\frac{\partial}{\partial t} u = div\left(\tilde{f}(J_\rho(\nabla pred(x))) \nabla u\right) \tag{31}$$

with initial and boundary conditions as described above. In some implementations, edges and their directions are detected in terms of the gradient of the initial prediction signal. Therefore, the nonlinear diffusion filter may perform n correlations of the prediction signal pred with a mask h(x) that is different at each position x∈ $\mathbb{R}^2$ and is computed out of the prediction signal pred as follows.

First, in order to identify edges, a Gaussian-smoothed diffusion tensor according to Equation (32):

$$J_\rho(\nabla pred) := K * \nabla pred \, \nabla pred^T \tag{32}$$

is constructed, with a Gaussian kernel K. The discrete gradient ∇pred=(EW, NS)$^T$ is calculated using finite differences, namely by Equation (33):

$$EW := \begin{bmatrix} 0 & 0 & 0 \\ -1 & 0 & 1 \\ 0 & 0 & 0 \end{bmatrix} * pred \text{ and } NS := \begin{bmatrix} 0 & 1 & 0 \\ 0 & 0 & 0 \\ 0 & -1 & 0 \end{bmatrix} * pred \tag{33}$$

using boundary conditions as described above. That means the gradient components EW and NS are given by simple differences of two sample values.

Then, for each sample location x∈ $\mathbb{R}^2$ inside the prediction block area, the 2×2 diffusion tensor is given by Equation (34)

$$4\nabla pred(x)\nabla pred(x)^T = \begin{pmatrix} EW(x) \cdot EW(x) & EW(x) \cdot NS(x) \\ EW(x) \cdot NS(x) & NS(x) \cdot NS(x) \end{pmatrix} \tag{34}$$

where the multiplication dot is understood to be pointwise. The Gaussian kernel is chosen according to Equation (35):

$$K = \frac{1}{4}\begin{bmatrix} 0 & 1 & 0 \\ 1 & 2 & 1 \\ 0 & 1 & 0 \end{bmatrix}. \tag{35}$$

The Gaussian kernel is applied on the gradient matrices EW·EW, EW·NS and NS·NS. This way, a symmetric 2×2 matrix according to Equation (36) is received:

$$J_\rho(\nabla pred(x)) = \tag{36}$$
$$\frac{1}{4}\begin{pmatrix} g_{xx} & g_{xy} \\ g_{xy} & g_{yy} \end{pmatrix}(x) = \frac{1}{4}\begin{pmatrix} ((K*(EW \cdot EW))(x) & ((K*(EW \cdot NS))(x) \\ ((K*(EW \cdot NS))(x) & ((K*(NS \cdot NS))(x) \end{pmatrix}$$

for every x∈ $\mathbb{R}^2$ inside the prediction block area.

Secondly, the matrices $J_\rho$(∇pred (x)) are diagonalized to satisfy Equation (37):

$$\begin{pmatrix} \lambda_1(x) & 0 \\ 0 & \lambda_2(x) \end{pmatrix} = \begin{pmatrix} \cos(\theta) & -\sin(\theta) \\ \sin(\theta) & \cos(\theta) \end{pmatrix} J_\rho(\nabla pred(x)) \begin{pmatrix} \cos(\theta) & \sin(\theta) \\ -\sin(\theta) & \cos(\theta) \end{pmatrix} \tag{37}$$

where $\lambda_1$(x), $\lambda_2$(x) denote the eigenvalues of $J_\rho$(∇pred (x)) and θ represents the associated rotation angle in the coordinate system. Using trigonometric formulas, it can be shown that $$\lambda_1(x) = \frac{1}{4}(g_{xx}(x) - g_{xy}(x)\tan(\theta)), \quad (38)$$

$$\lambda_2(x) = \frac{1}{4}(g_{yy}(x) - g_{xy}(x)\tan(\theta)), \quad (39)$$

where $$\tan(2\theta) = \frac{2g_{xy}(x)}{g_{yy}(x) - g_{xx}(x)} \quad (40)$$

In some implementations, the determination of the eigenvalues $\lambda_1$, $\lambda_2$ is implemented using integer look-up tables. For that purpose, with a and b representing the rounded integers according to Equation (41)

$$a = \left[256 \cdot \frac{2g_{xy}}{g_{yy} - g_{xx}}\right] \text{ and } b = \left[256 \cdot \frac{g_{yy} - g_{xx}}{2g_{xy}}\right], \quad (41)$$

the following expressions are tabulated for a=0, ..., 256 and b=0, ..., 256, according to Equations (42)-(47):

$$tab_1[a] = \left[256 \cdot \cos\left(0.5 \cdot a\tan\left(\frac{a}{256}\right)\right)^2\right] \quad (42)$$

$$tab_2[a] = \left[256 \cdot \cos\left(0.5 \cdot a\tan\left(\frac{a}{256}\right)\right) \cdot \sin\left(0.5 \cdot a\tan\left(\frac{a}{256}\right)\right)\right] \quad (43)$$

$$tab_3[a] = \left[256 \cdot \sin\left(0.5 \cdot a\tan\left(\frac{a}{256}\right)\right)^2\right] \quad (44)$$

$$tab_4[b] = \left[256 \cdot \cos\left(0.5 \cdot a\tan\left(\frac{256}{b}\right)\right)^2\right] \quad (45)$$

$$tab_5[b] = \left[256 \cdot \cos\left(0.5 \cdot a\tan\left(\frac{256}{b}\right)\right) \cdot \sin\left(0.5 \cdot a\tan\left(\frac{256}{b}\right)\right)\right] \quad (46)$$

$$tab_6[b] = \left[256 \cdot \sin\left(0.5 \cdot a\tan\left(\frac{256}{b}\right)\right)^2\right] \quad (47)$$

where the square brackets [ ] specify rounding to the next integer.

Next, a function $f$ is applied to the eigenvalues $\lambda_1$, $\lambda_2$ of $J_\rho(\nabla pred)$ which serves as an edge detector: if eigenvalues $\lambda_1$, $\lambda_2$ are large, i.e., an edge is indicated, function $f$ will be small. Function $f$ is chosen in case of intra as an approximation of $$f(s) = \exp\left(\frac{-s}{\mu}\right),$$

and in case of inter as $$f(s) = 1\Big/\left(1 + \frac{s}{\mu}\right)$$

with parameter $\mu > 0$. In the implementation, the factor ¼ can be incorporated into function $f$. The Parameter $\mu$ is a fixed value given by Equation (48):

$$\mu = \begin{cases} 200, & \text{for intra prediction} \\ 64, & \text{for inter prediction and } QP < 33. \\ 550, & \text{for inter prediction and } QP \geq 33 \end{cases} \quad (48)$$

The two functions $f(s)$ are tabulated using integer tables. After applying the function $f$, the matrix is retransformed according to Equation (49):

$$\tilde{f}(J_\rho(\nabla pred(x))) := \begin{pmatrix} \cos(\theta) & \sin(\theta) \\ -\sin(\theta) & \cos(\theta) \end{pmatrix} \begin{pmatrix} f(\lambda_1) & 0 \\ 0 & F(\lambda_2) \end{pmatrix} = \quad (49)$$

$$\begin{pmatrix} \cos(\theta) & -\sin(\theta) \\ \sin(\theta) & \cos(\theta) \end{pmatrix} =: \begin{pmatrix} a_{xx} & a_{xy} \\ a_{xy} & a_{yy} \end{pmatrix}(x)$$

Using this sample-wise definition, three functions $a_{xx}$, $a_{xy}$, $a_{yy}$ are defined with an entry for each sample location $x \in \mathbb{R}^2$ inside the prediction block area. Similarly, as described above the rotation of the 2×2 matrix is implemented using the look-up tables given above.

Given the arrays $a_{xx}(x)$, $a_{xy}(x)$, $a_{yy}(x)$ for each sample location $x \in \mathbb{R}^2$, the following 8 arrays are derived using a simple averaging of two neighboring samples:

$$wN := \frac{1}{2}\begin{bmatrix} 0 & 1 & 0 \\ 0 & 1 & 0 \\ 0 & 0 & 0 \end{bmatrix} * a_{yy} \quad (50)$$

$$wS := \frac{1}{2}\begin{bmatrix} 0 & 0 & 0 \\ 0 & 1 & 0 \\ 0 & 1 & 0 \end{bmatrix} * a_{yy} \quad (51)$$

$$wW := \frac{1}{2}\begin{bmatrix} 0 & 0 & 0 \\ 1 & 1 & 0 \\ 0 & 0 & 0 \end{bmatrix} * a_{xx} \quad (52)$$

$$wE := \frac{1}{2}\begin{bmatrix} 0 & 0 & 0 \\ 0 & 1 & 1 \\ 0 & 0 & 0 \end{bmatrix} * a_{xx} \quad (53)$$

$$wO1 := \frac{1}{4}\begin{bmatrix} 0 & 1 & 0 \\ 0 & 0 & 1 \\ 0 & 0 & 0 \end{bmatrix} * a_{xy} \quad (54)$$

$$wO2 := \frac{1}{4}\begin{bmatrix} 0 & 0 & 0 \\ 0 & 0 & 1 \\ 0 & 1 & 0 \end{bmatrix} * a_{xy} \quad (55)$$

$$wO3 := \frac{1}{4}\begin{bmatrix} 0 & 1 & 0 \\ 1 & 0 & 0 \\ 0 & 0 & 0 \end{bmatrix} * a_{xy} \quad (56)$$

$$wO4 := \frac{1}{4}\begin{bmatrix} 0 & 0 & 0 \\ 1 & 0 & 0 \\ 0 & 1 & 0 \end{bmatrix} * a_{xy}. \quad (57)$$

The integer weighting matrices (50)-(57) of wN, wS, wW, wE, wO1, wO2, wO3, wO4 are calculated at the beginning of the non-linear diffusion filter process. These matrices are used for the actual filtering in the iteration steps. For summarizing the approach, the integer weighting matrices are derived by the following ordered steps:

Step 1: Calculate discrete samples differences EW(x) and NS(x)

Step 2: Calculate products (EW·EW)(x), (EW·NS)(x), (NS·NS)(x)

Step 3: Filter the three products with a 5-tap filter kernel for obtaining the gradient arrays $g_{xx}(x)$, $g_{xy}(x)$, and $g_{yy}(x)$ Step 4: Determine the eigenvalues $\lambda_1(x)$, $\lambda_2(x)$ using look-up tables Step 5: Apply a function $f(s)$ to the eigenvalues using pre-defined look-up tables Step 6: Derive the integer arrays $a_{xx}(x)$, $a_{xy}(x)$, and $a_{yy}(x)$ using look-up tables Step 7: Derive the integer weighting arrays wN, wS, wW, wE, wO1, wO2, wO3, and wO4 using sample averages.

Given the arrays wN, wS, wW, wE, wO1, wO2, wO3, and wO4 for the sample locations $x \in \mathbb{R}^2$, the iterative filtering proceeds as follows. Let $u_0$=pred represent the initial luma prediction signal. In each iteration step, the signal u is modified according to Equation (58):

$$u_{t+1} = u_t + \frac{1}{4}\left(wO1 \cdot \left(\begin{bmatrix} 0 & 0 & 1 \\ 0 & 0 & 0 \\ 0 & 0 & 0 \end{bmatrix} * u_t\right) - wO2 \cdot \left(\begin{bmatrix} 0 & 0 & 0 \\ 0 & 0 & 0 \\ 0 & 0 & 1 \end{bmatrix} * u_t\right) - wO3 \cdot \left(\begin{bmatrix} 1 & 0 & 0 \\ 0 & 0 & 0 \\ 0 & 0 & 0 \end{bmatrix} * u_t\right) + wO4 \cdot \left(\begin{bmatrix} 0 & 0 & 0 \\ 0 & 0 & 0 \\ 1 & 0 & 0 \end{bmatrix} * u_t\right) + wN \cdot \left(\begin{bmatrix} 0 & 1 & 0 \\ 0 & -1 & 0 \\ 0 & 0 & 0 \end{bmatrix} * u_t\right) + wW \cdot \left(\begin{bmatrix} 0 & 0 & 0 \\ 1 & -1 & 0 \\ 0 & 0 & 0 \end{bmatrix} * u_t\right) + wE \cdot \left(\begin{bmatrix} 0 & 0 & 0 \\ 0 & -1 & 1 \\ 0 & 0 & 0 \end{bmatrix} * u_t\right) + wS \cdot \left(\begin{bmatrix} 0 & 0 & 0 \\ 0 & -1 & 0 \\ 0 & 1 & 0 \end{bmatrix} * u_t\right)\right) \quad (58)$$

where the multiplication dot and the summation is to be understood pointwise. Mapping $u_{t+1}$ denotes the filtered prediction after t+1 iteration steps. In this implementation, diffusion along edges is preferred over diffusion perpendicular to them. The nonlinear filter is applied to the prediction for two different amounts of iteration steps which corresponds to two nonlinear diffusion filter modes from which the encoder can choose. The encoder can be chosen between 5 and 20 iteration steps, for intra-prediction, and between 4 and 8 for inter-prediction. The filtered prediction u is used as the modified prediction block.

Non-local structure-based loop filter (NLSF) may contain two modules: group construction by block matching and SVD-based filtering. The collaborative filtering is achieved by iterative singular value decomposition (SVD) that calculates the singular values with their singular vectors by iterative power method whose internal data type utilizes double precision float-point representation. To adapt the video coding standard as well as being hardware friendly, this issue can be addressed by eliminating the double precision values via the decimal digits clipping after shifting the intermediate results to large numbers during iterations.

Figure 8:
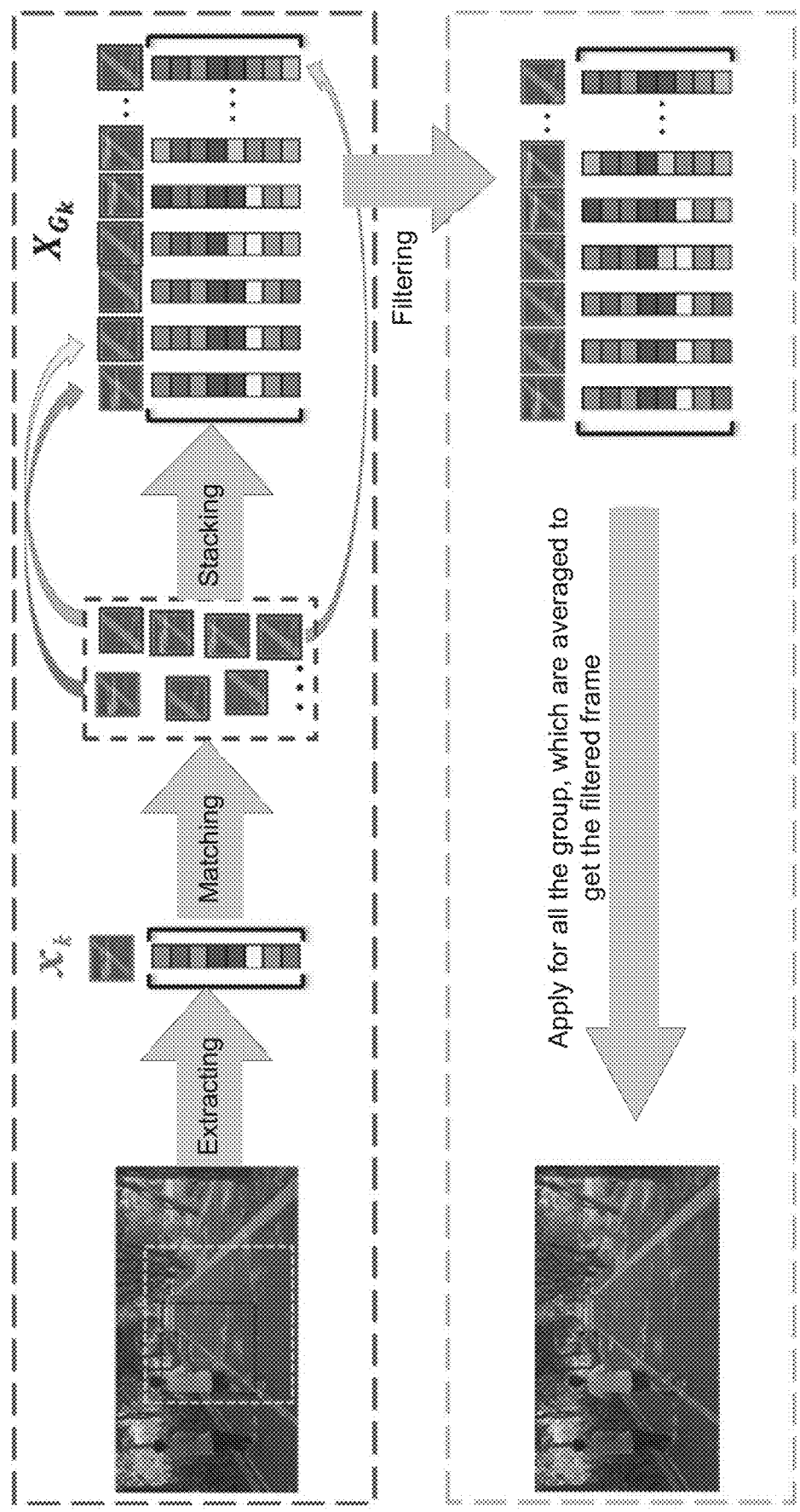
FIG. 8 is an illustration of an exemplary Non-Local Structure-based Filter (NLSF) in accordance with some examples.

FIG. 8 is an illustration of an exemplary NLSF. As illustrated in FIG. 8, the input reconstructed frame is firstly divided into K overlapped blocks, and each block serves as the basic loop unit. Let $B_s \times B_s$ denote the size of loop unit, which is set to 6 by default. For each loop unit, it is stretched as a vector $x_k \in \mathcal{R}^{B_s \times B_s}$, k=1, 2, ..., K. Then, for each block $x_k$, no more than c (defaulted to 20) similar blocks are collected within the corresponding search window to construct the block group. In the example of FIG. 8, the red square represents the current loop unit, meanwhile the blue dotted square denotes the search window and the golden dotted square denotes the CTU current block located in. m represents the number of similar blocks selected in block matching process. After block matching process, all the similar blocks selected are stacked into a matrix of size $B_s^2 \times m$, denoted by $X_{G_k}$, where each column of the matrix corresponds to one block, i.e. $X_{G_k} = [x_{G_k \otimes 1}, x_{G_k \otimes 2}, \ldots, x_{G_k \otimes m}]$.

In some implementations, each group $X_{G_k} = [x_{G_k \otimes 1}, x_{G_k \otimes 2}, \ldots, x_{G_k \otimes m}]$, k=1, 2, ..., K, is decomposed by SVD according to Equation (59):

$$X_{G_k} = U_{G_k} \sum\nolimits_{G_k} V_{G_k}^T = \sum\nolimits_{i=1}^{m} \gamma_{x_{G_k \otimes i}} \left(u_{G_k \otimes i} v_{G_k \otimes i}^T\right) \quad (59)$$

where $$\gamma_{x_{G_k}} = \left[\gamma_{x_{G_k \otimes 1}}; \gamma_{x_{G_k \otimes 2}}; \ldots; \gamma_{x_{G_k \otimes m}}\right]$$

is a column vector, $$\sum\nolimits_{G_k} = \text{diag}(\gamma_{x_{G_k}})$$

is a diagonal matrix with the elements of $$\gamma_{x_{G_k}}$$

on its main diagonal, and $u_{G_k \otimes 1}$, $v_{G_k \otimes 1}$ are the columns of $U_{G_k}$ and $V_{G_k}$, separately. To suppress the compression noise, the hard thresholding operation may be applied to the singular values, $$\gamma_{x_{G_k}},$$

according to Equation (60):

$$\alpha_{G_k} = \text{hard}(\gamma_{x_{G_k}}, \tau)$$

where hard(x, a)=x⊙1 (abs(x)−a) denotes the operator of hard thresholding and ⊙ stands for the element-wise product of two vectors. τ denotes the threshold.

As the threshold r used in hard thresholding process is related to Qstep. The relationship between QP and Qstep for an orthonormal transform is formulated according to Equation (61).

$$Qstep = 2^{\frac{QP-4}{6}} \quad (61)$$

The relationship between τ and Qstep is linear as indicated by Equation (62):

$$\tau = (a \times Qstep + b) \times \left(B_s^2 + \sqrt{c}\right) \quad (62)$$

where a and b represent the parameter trained offline. a and b are double type variables.

The filtered image can be reconstructed from the shrunk singular values $\alpha_{G_k}$, and the reconstruction for group $\hat{X}_{G_k}$ can be formulated according to Equation (63):

$$\hat{X}_{G_k} = \sum\nolimits_{i=1}^{m} \alpha_{G_k \otimes i} \left(u_{G_k \otimes i} v_{G_k \otimes i}^T\right) \quad (63)$$

This process can be applied for all K groups to achieve $\hat{X}_{G_k}$, k=1, 2, ..., K. At last, all $\hat{X}_{G_k}$ are averaged to obtain the frame $\hat{x}$.

Embodiments of this disclosure provide an improvement of the coding efficiency of filtering in video coding, including VVC and ECM. More specifically, a novel invertible filtering (InvF) scheme is developed to further improve the coding efficiency of the prediction and loop filtering. In some implementations, non-local correlation is considered and incorporated with the InvIF. In some further implementations, the disclosure also discusses when InvIF should be applied in video coding.

Figure 9:
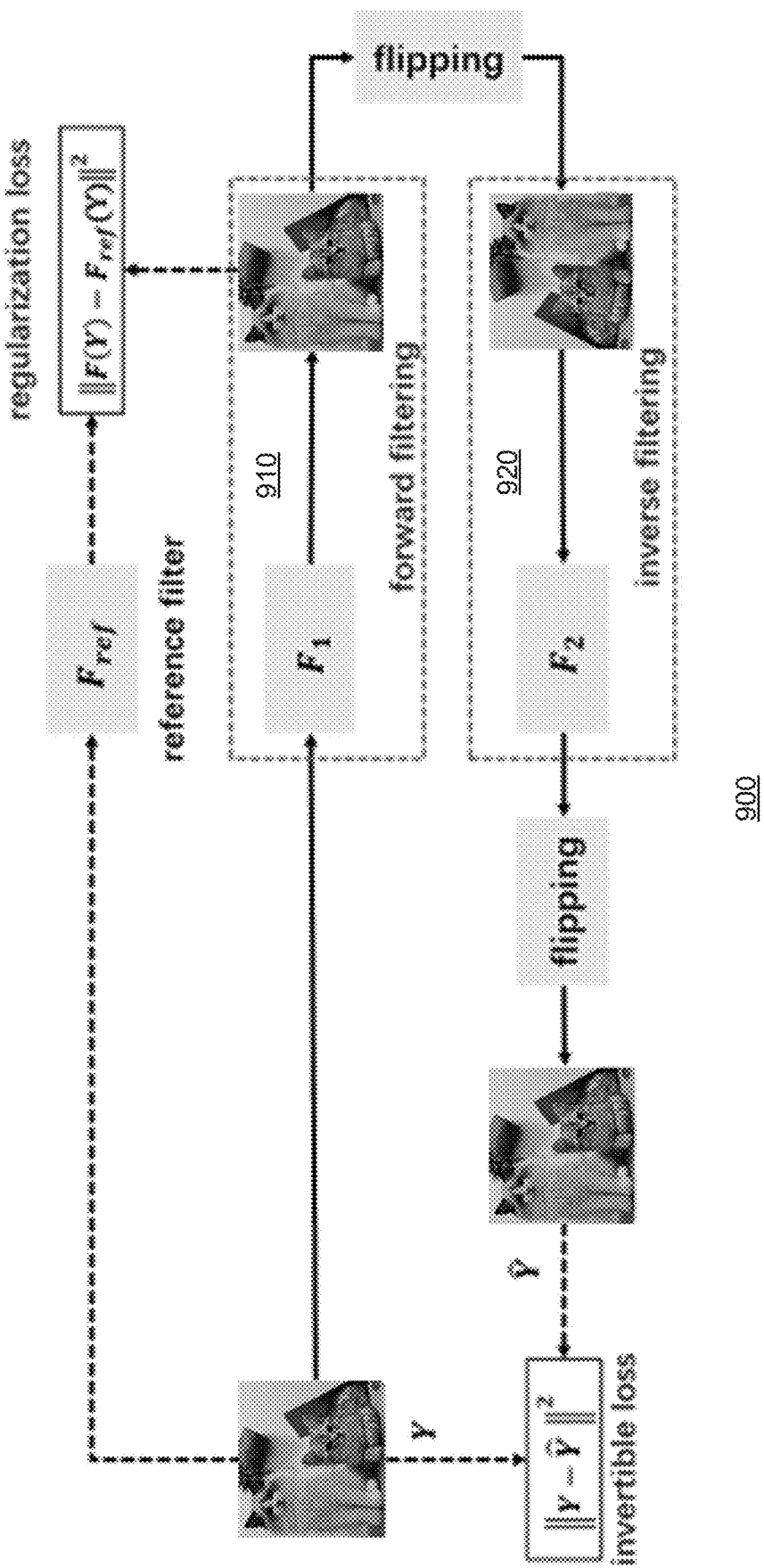
FIG. 9 is an illustration of an exemplary invertible filtering scheme in accordance with some implementations of the present disclosure.

FIG. 9 is an illustration of an exemplary invertible filtering scheme 900 in accordance with some implementations of the present disclosure. As shown in the example of FIG. 9, invertible filtering scheme 900 may include a forward filtering module 910 and an inverse filtering module 920. In forward filtering module 910, the input image Y is filtered with a forward filter $F_1$ to generate the intermediate image $Y_i$, according to Equation (64)

$$Y_i = F_1(Y), \qquad (64)$$

where $F_1(\cdot)$ denotes the forward filter.

The intermediate image is then flipped and fed into inverse filtering module 920. In inverse filtering module 920, the flipped intermediate image is filtered with an inverse filter $F_2$ to generate a reconstructed image $Y_r$, according to Equation (65):

$$Y_r = F_2(\Psi(Y_i)), \qquad (65)$$

where $F_2(\cdot)$ denotes the inverse filter and $\Psi(\cdot)$ denotes the flipping operation.

The reconstructed image is then inverse flipped to generate an invertible reconstructed image $\hat{Y}$, targeting to recover the input image Y.

The filter coefficients of the forward filter and inverse filter need to be derived before conducting the filtering operation. To this end, two loss functions can be used to optimize the filter coefficients, including the regularization loss and the invertible loss. The regularization loss measures the difference between the intermediate image and a reference image. The reference image is generated by conducting filtering on the input image with a reference filter. In some implementations, the regularization loss $L_{reg}$ can be described by Equation (66):

$$L_{reg} = \|F_1(Y) - F_{ref}(Y)\|^2, \qquad (66)$$

where $F_1(\cdot)$ denotes the forward filter and $F_{ref}(\cdot)$ denotes the reference filter.

The invertible loss is used to measure the invertible reconstruction ability of the forward and inverse filters, which measures the difference between the input image and the invertible reconstructed image $\hat{Y}$. In some implementations, the invertible loss can be described by Equation (67):

$$L_{inv} = \|Y - \hat{Y}\|^2 = \|Y - \Psi(F_2(\Psi(F_1(Y))))\|^2 \qquad (67)$$

where $F_1(\cdot)$ denotes the forward filter, $F_2(\cdot)$ denotes the inverse filter, and $\Psi(\cdot)$ denotes the flipping operation.

In some implementations, the regularization loss and invertible loss are weighted to form the final loss to derive the filter coefficients of the forward filter and inverse filter, e.g., as shown in Equation 68):

$$L = \alpha \times \|F_1(Y) - F_{ref}(Y)\|^2 + (1-\alpha) \times \|Y - \Psi(F_2(\Psi(F_1(Y))))\|^2 \qquad (68)$$

where the regularization loss is weighted by $\alpha$ and the invertible loss is weighted by $1-\alpha$.

Because the reference filter $F_{ref}(\cdot)$ may generate a phase shift, the flipping operation $\Psi(\cdot)$ is utilized to cancel out the phase shift. As a result, the invertible reconstructed image $\hat{Y}$ has no phase shift compared with the input image Y. In some implementations, the types of the flipping operation include horizontal flipping, vertical flipping and diagonal flipping, etc., depending on the phase shift in the frequency domain (or conversely, fractional shift in the spatial domain). Therefore, the flipping direction can be selected from horizontal, vertical, diagonal or other appropriate directions. For example, FIG. 9 shows a horizontal flip of the intermediate image $Y_i$. It is contemplated that invertible filtering scheme 900 can be implemented along other flipping directions as well.

Consistent with the disclosure, the topology or architecture of forward filter $F_1$ and the inverse filter $F_2$ are not limited. Any topology or architecture can be used, including but not limited to one-dimensional filter, two-dimensional filter or convolutional neural networks (CNN). If one-dimensional or two-dimensional linear filters are used for $F_1$ and $F_2$, the filter coefficients of $F_1$ and $F_2$ can be derived using Wiener-Hopf equation as adaptive loop filter, or derived using gradient descent. If advanced non-linear filters are utilized, the filter coefficients can be derived using gradient descent, by training CNN.

It is contemplated that the forward filter $F_1$ and the inverse filter $F_2$ can share the same filter coefficients or have their own coefficients. By sharing filter coefficients between the two filters, the number of filter coefficients can be reduced.

Certain simplified embodiments can help reduce the complexity of deriving the filter coefficients. In the first simplified embodiment, fixed filters are used for both $F_1$ and $F_2$, therefore the filter derivation is not required any more. Typical interpolation filters, such as half-pel interpolation filter or quarter-pel interpolation filter can be used. In the second simplified embodiment, the first filter $F_1$ is fixed and the second filter $F_2$ is derived. For example, DCTIF (but not limited) can be used for $F_1$ and any topology or architecture can be used for $F_2$.

Because the derivation of the filter coefficients is constrained by the regularization loss through the reference filter, the selection of the reference filter may have a large impact on the performance of the invertible filtering. For example, if the reference filter is a strength filter, the derived filter also tends to be a strength filter, and vice versa. Therefore, the reference filter can be selected depending on whether strength or weak filtering is needed. As another example, if the reference filter is an interpolation filter, which leads to the phase shift, then the derived filter is also an interpolation filter. Similarly, if the reference filter leads to zero phase shift, then the derived filter does not lead to phase shift, either.

In some implementations, the type of the reference filter can be determined at the encoder side, and signaled in the bitstream. In some alternative implementations, the reference filter type can be implicitly inferred at the decoder side.

In some implementations, a motion vector (MV) based reference filter selection method can be used. In inter-prediction, interpolation filtering is directly related to MV of each PU. Accordingly, the reference filter type can be determined based on the MV of the PU. In one example, if the PU is coded with uni-prediction, and the MV points to an integer position, then filtering without phase shift can be used as the reference filter, such as a Gaussian filter. In another example, if the PU is coded with uni-prediction, and the MV points to a fractional position, a filter with the corresponding phase shift can be used as the reference filter. For instance, if the MV points to the half-pel, then half-pel interpolation filter can be used as the reference filter. In a further example, if the PU is coded with bi-prediction, and the MVs in both directions point to the same fractional position, then the filter with the corresponding phase shift is used as the reference filter. In yet another example, if the PU is coded with bi-prediction, and the MVs in both directions point to different fractional positions, then the half-pel interpolation or the filter without phase shift is used as the reference filter.

Invertible filtering scheme 900 can be applied in any filtering module in video coding, which generally fall into two categories: prediction filtering and loop filtering. In some implementations, invertible filtering scheme 900 can also be applied in the post-filtering stage.

When applying invertible filtering scheme 900 in prediction filtering, the invertible filter may be applied on a PU level and take a predicted block as input. In some implementations, forward filter $F_1$ derived as part of invertible filtering scheme 900 may be additionally used as an alternative interpolation filter of DCTIF, used for prediction.

When applying invertible filtering scheme 900 in loop filtering, the filter derivation can be conducted at different granularities, including the frame level, the CTU level and the CU/PU level. Since InvF is an unsupervised filter, the filter coefficients are derived at both encoder and decoder side, which do not need to be signaled in the bitstream.

In some implementations, invertible filtering scheme 900 can be applied in the entire image. However, the image may have different characteristics in different areas. To adapt to the inhomogeneity of the image signal, a block-based InvF on/off may be used. That is, the InvF can be applied (turned "on") or not applied (turned "off") for the different blocks within the image. For each block, a flag is signaled to indicate whether InvF is applied or not. In some implementations, the block size can be, but not limited to, the CTU size.

Figure 10:
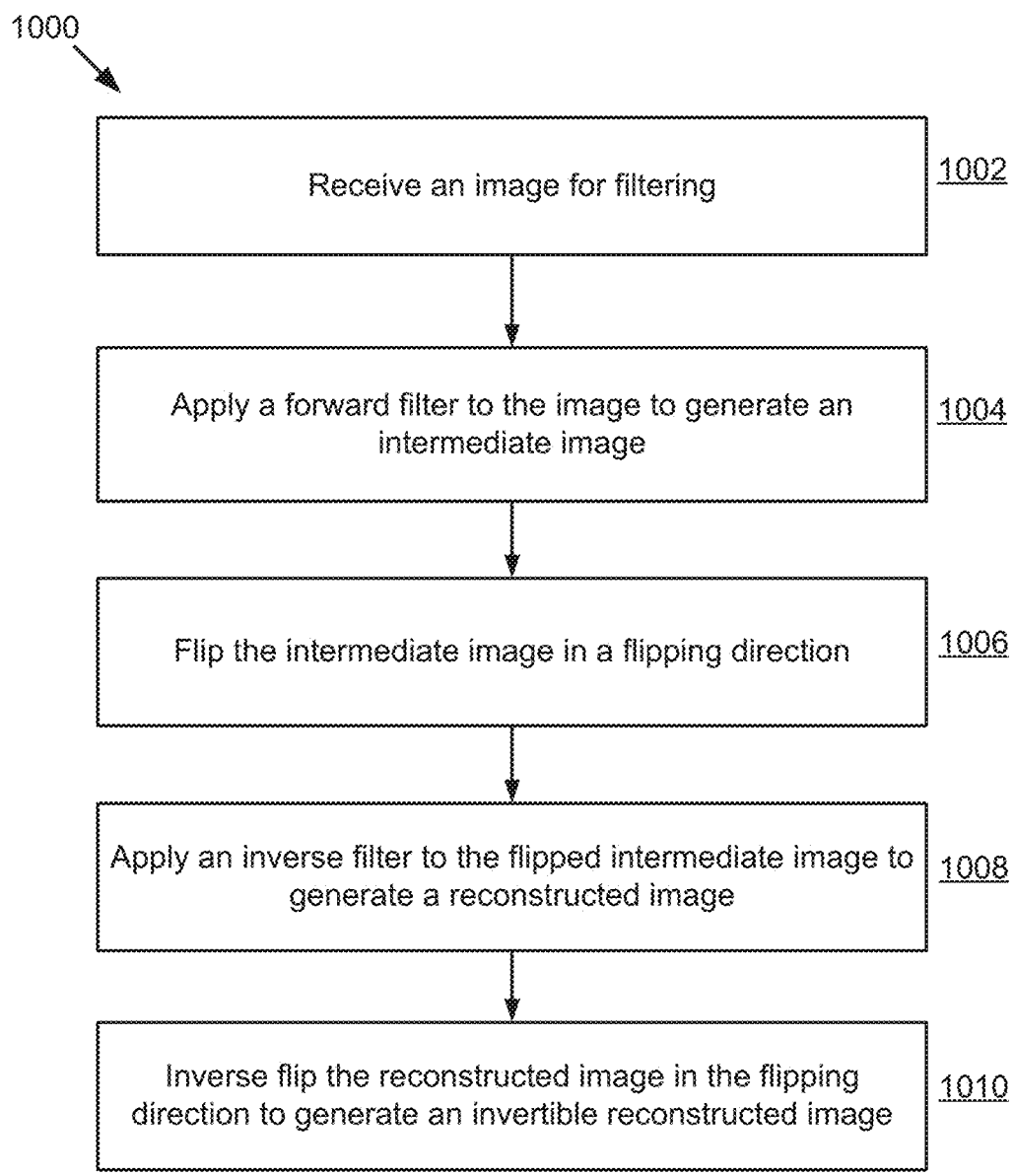
FIG. 10 is a flow chart of an exemplary method for invertible filtering in video coding in accordance with some implementations of the present disclosure.

FIG. 10 is a flow chart of an exemplary method for invertible filtering in video coding in accordance with some implementations of the present disclosure. Method 1000 may be implemented by a processor associated with video encoder 20 or video decoder 30, by applying the invertible filtering scheme described in connection with FIG. 10. Method 1000 may include steps 1002-1010 as described below. Some of the steps may be optional to perform the disclosure provided herein. Further, some of the steps may be performed simultaneously, or in a different order than shown in FIG. 10.

In step 1002, the processor may receive an image for filtering. The image can be derived from a video frame from a video. For example, the image may be a reconstructed block or a group of reconstructed blocks of the video frame, or the entire video frame. In some implementations, the filtering to be performed on the image may be part of any filtering module in video coding, including, e.g., prediction filtering, loop filtering, or post filtering. When applying method 1000 for prediction filtering, the image may be a predicted block. When applying method 1000 for loop filtering, the image can be, but not limited to, the entire video frame, a CTU, or a CU/PU.

In step 1004, the processor may apply a forward filter to the image to generate an intermediate image. For example, forward filter $F_1$ described in connection with FIG. 9 may be applied.

In step 1006, the processor may flip the intermediate image in a flipping direction. For example, flipping operation $\Psi(\bullet)$ described in connection with FIG. 9 may be performed. In some implementations, the flipping direction can be selected from horizontal, vertical, left-diagonal, right-diagonal, or other appropriate direction. Because flipping is performed to cancel out the phase shift generated by certain types of forward/inverse filter, step 1006 is optional and can be skipped if filter topologies without phase ship are selected for the forward/inverse filter.

In step 1008, the processor may apply an inverse filter to the flipped intermediate image to generate a reconstructed image. For example, inverse filter $F_2$ described in connection with FIG. 9 may be applied.

In step 1010, the processor may inversely flip the reconstructed image in the flipping direction to generate an invertible reconstructed image.

Figure 11:
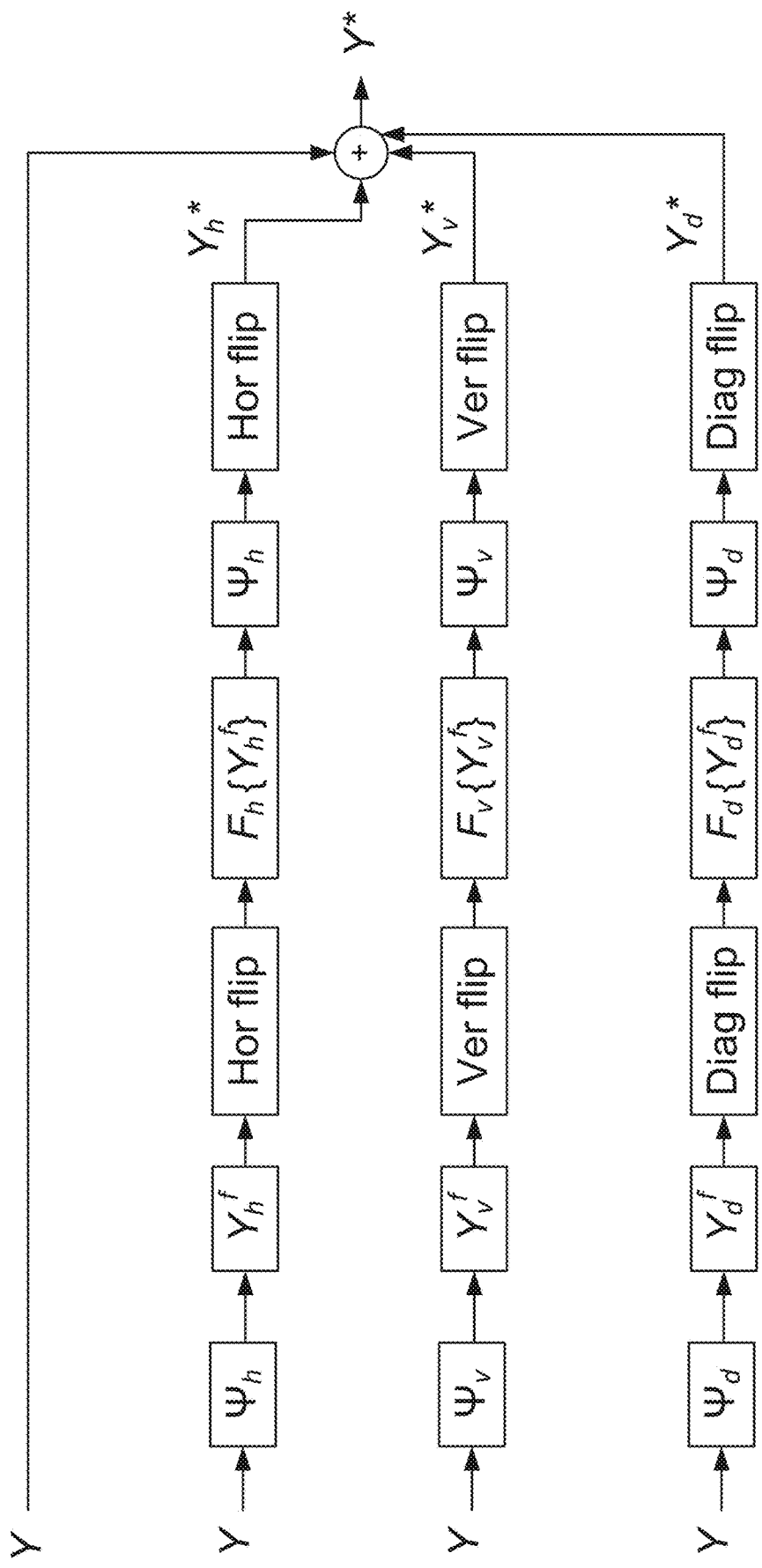
FIG. 11 is an illustration of exemplary invertible filtering along different directions in accordance with some implementations of the present disclosure.

In some implementations, invertible filtering, such as method 1000, may be performed in multiple directions and the filtered results along different directions can be obtained and weighted to generate the final filtered result. For example, FIG. 11 is an illustration of exemplary invertible filtering along different directions in accordance with some implementations of the present disclosure. Although FIG. 11 shows an example of multi-directional invertible filtering is applied in all three directions: horizontal, vertical, or diagonal, it is contemplated that two directions or one direction along with the unfiltered image can be used, in other implementations.

In the example of FIG. 11, horizontal invertible filtering may be applied to generate a filtered image $Y_h^*$ by performing method 1000 using the horizontal direction as the flipping direction. Similarly, vertical and diagonal filtering can be applied by performing method 1000 in the vertical and diagonal flipping directions, respectively, to generate filtered images $Y_v^*$ and $Y_d^*$. Accordingly, the final filtered result can be determined as a weighted sum of four filtered images, according to Equation (69).

$$Y^* = \omega * Y + \omega_h * Y_h^* + \omega_v * Y_v^* + \omega_d * Y_d^* \qquad (69)$$

where $\omega$, $\omega_h$, $\omega_v$, and $\omega_d$ are weighting factors for the unfiltered image Y, horizontally filtered image $Y_h^*$, vertically filtered image $Y_v^*$ and diagonally filtered image $Y_d^*$, respectively.

For multi-directional invertible filtering, an interpolation filter can be used as the reference filter. The interpolation filtering operation can also be conducted along the horizontal, vertical or diagonal direction, consistent with the directions used in the invertible filtering. In some implementations, the interpolation filter used for each direction can be different or share the same filter coefficients.

In some implementations, non-local correction may be considered in InvF, similar to NLSF. To implement non-local invertible filtering, the image may be firstly divided into N×N blocks. Then the correlated blocks of the current to-be-filtered block are searched according to a metric which is used to measure the difference between the current block and the searched blocks. For example, the metric can be sum of absolute difference (SAD). For an intra slice, the block searching process can be conducted in the current picture. In comparison, for an inter slice, besides the current picture, searching in the reference picture is also allowed, to further enhance the performance for inter slice.

The searched blocks are then ranked according to the metric value and the top-K blocks which lead to smallest metric values are used to derive the filter coefficients of $F_1$ and $F_2$. The top-K correlated blocks are denoted as $Y_j$ (j=0, . . . , K−1). According, the loss function for deriving the non-local invertible filters can be described by Equation (70):

$$L = \alpha \times \sum\nolimits_{j=0}^{K-1} \|F_1(Y_j) - F_{ref}(Y_j)\|^2 + \qquad (70)$$
$$(1-\alpha) \times \sum\nolimits_{j=0}^{k-1} \|Y_j - \Psi(F_2(\Psi(F_1(Y_j))))\|^2$$

where the regularization loss is weighted by $\alpha$ and the invertible loss is weighted by 1−$\alpha$.

FIG. 12 shows a computing environment 1210 coupled with a user interface 1250, according to some implementations of the present disclosure. The computing environment 1210 can be part of a data processing server. The computing environment 1210 includes a processor 1220, a memory 1230, and an Input/Output (I/O) interface 1240. In some implementations, computing environment 1210 may be used for implementing video encoder 20 and/or video decoder 30.

The processor 1220 typically controls overall operations of the computing environment 1210, such as the operations associated with display, data acquisition, data communications, and image processing. The processor 1220 may include one or more processors to execute instructions to perform all or some of the steps in the above-described methods. Moreover, the processor 1220 may include one or more modules that facilitate the interaction between the processor 1220 and other components. The processor 1220 may be a Central Processing Unit (CPU), a microprocessor, a single chip machine, a Graphical Processing Unit (GPU), or the like.

The memory 1230 is configured to store various types of data to support the operation of the computing environment 1210. The memory 1230 may include predetermined software 1232. Examples of such data include instructions for any applications or methods operated on the computing environment 1210, video datasets, image data, etc. The memory 1230 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1240 provides an interface between the processor 1220 and peripheral interface modules, such as a keyboard, a click wheel, buttons, or the like. The buttons may include but are not limited to, a home button, a start scan button, and a stop scan button. The I/O interface 1240 can be coupled with an encoder and decoder.

In some implementations, there is also provided a non-transitory computer-readable storage medium including a plurality of programs, for example, in the memory 1230, executable by the processor 1220 in the computing environment 1210, for performing the above-described methods. In one example, the plurality of programs may be executed by the processor 1220 in the computing environment 1210 to receive (for example, from the video encoder 20 in FIG. 2) a bitstream or data stream including encoded video information (for example, video blocks representing encoded video frames, and/or associated one or more syntax elements, etc.), and may also be executed by the processor 1220 in the computing environment 1210 to perform the decoding method described above according to the received bitstream or data stream. In another example, the plurality of programs may be executed by the processor 1220 in the computing environment 1210 to perform the encoding method described above to encode video information (for example, video blocks representing video frames, and/or associated one or more syntax elements, etc.) into a bitstream or data stream, and may also be executed by the processor 1220 in the computing environment 1210 to transmit the bitstream or data stream (for example, to the video decoder 30 in FIG. 3). Alternatively, the non-transitory computer-readable storage medium may have stored therein a bitstream or a data stream including encoded video information (for example, video blocks representing encoded video frames, and/or associated one or more syntax elements, etc.) generated by an encoder (for example, video encoder 20 in FIG. 2) using, for example, the encoding method described above for use by a decoder (for example, video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In some implementations, there is also provided a computing device including one or more processors (for example, the processor 1220); and the non-transitory computer-readable storage medium or the memory 1230 having stored therein a plurality of programs executable by the one or more processors, wherein the one or more processors, upon execution of the plurality of programs, are configured to perform the above-described methods.

In some implementations, there is also provided a computer program product including a plurality of programs, for example, in the memory 1230, executable by the processor 1220 in the computing environment 1210, for performing the above-described methods. For example, the computer program product may include the non-transitory computer-readable storage medium.

In some implementations, the computing environment 1210 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A video processing method for invertible filtering in video coding, comprising:
   receiving, by a processor, an image derived from encoded video information of a video frame of a video stored in a bitstream;
   applying, by the processor, a forward filter to the image to generate an intermediate image;
   flipping the intermediate image;
   applying, by the processor, an inverse filter to the flipped intermediate image to generate a reconstructed image; and
   inversely flipping the reconstructed image to generate an invertible reconstructed image,
   wherein flipping the intermediate image comprises:
   flipping the intermediate image in a flipping direction determined based on a frequency-domain phase shift caused by the forward filter or the inverse filter.

2. The video processing method of claim 1, wherein the forward filter and the inverse filter share same filter coefficients.

3. The video processing method of claim 1,
   wherein inversely flipping the reconstructed image to generate the invertible reconstructed image comprises:
   inversely flipping the reconstructed image in the flipping direction used for flipping the intermediate image to generate the invertible reconstructed image.

4. The video processing method of claim 1, wherein the flipping direction is a horizontal direction, a vertical direction, or a diagonal direction.

5. The video processing method of claim 4, wherein flipping the intermediate image in the flipping direction comprises:
   flipping the intermediate image in a plurality of flipping directions,
   wherein applying, by the processor, the inverse filter to the flipped intermediate image to generate the reconstructed image comprises:
   applying, by the processor, the inverse filter to a plurality of flipped intermediate images to generate a plurality of reconstructed images, and
   wherein inversely flipping the reconstructed image to generate the invertible reconstructed image comprises:
   inversely flipping the plurality of reconstructed images to generate a plurality of invertible reconstructed images; and
   determining a final invertible reconstructed image as a weighted sum of the plurality of invertible reconstructed images and the received image.

6. The video processing method of claim 1, wherein filter coefficients of the forward filter or the inverse filter are derived to optimize a loss function comprising a regularization loss and an invertible loss.

7. The video processing method of claim 6, wherein the regularization loss measures a difference between the intermediate image and a reference image, wherein the reference image is obtained by applying a reference filter to the received image.

8. The video processing method of claim 7, wherein the reference filter is an interpolation filter used for interpolating a video block associated with the video frame.

9. The video processing method of claim 7, wherein a type of the reference filter is determined based on a motion vector associated with the video frame.

10. The video processing method of claim 7, wherein a type of the reference filter is signaled in the bitstream comprising the encoded video information.

11. The video processing method of claim 6, wherein the invertible loss measures a difference between the invertible reconstructed image and the received image.

12. The video processing method of claim 6, wherein the forward filter or the inverse filter is a one-dimensional or two-dimensional linear filter, wherein the filter coefficients of the forward filter or the inverse filter are derived using Wiener-Hopf equation or using gradient descent.

13. The video processing method of claim 6, wherein the forward filter or the inverse filter is a convolutional neural network trained based on the loss function.

14. The video processing method of claim 6, wherein the filter coefficients of at least one of the forward filter or the inverse filter are fixed and not derived based on the loss function.

15. The video processing method of claim 6, wherein the image is divided into a plurality of blocks, wherein the filter coefficients of the forward filter or the inverse filter are derived based on a predetermined number of most correlated blocks among the plurality of blocks.

16. The video processing method of claim 15, wherein the predetermined number of most correlated blocks are searched and identified using a metric measuring a difference between a current block and a searched block among the plurality of blocks.

17. The video processing method of claim 1, wherein the received image is derived from the entire video frame, a coding tree unit of the video frame, a coding unit of the video frame, or a prediction unit of the video frame.

18. The video processing method of claim 1, wherein the received image comprises a plurality of video blocks, wherein an index is signaled for each video block in the bitstream comprising the encoded video information, the index indicating whether the invertible filtering is turned on for the corresponding video block.

19. A video processing apparatus performing invertible filtering in video coding, comprising:
   a memory configured to store a bitstream comprising encoded video information of a video frame of a video; and
   a processor coupled to the memory and configured to:
   apply a forward filter to an image derived from the encoded video information to generate an intermediate image;
   flip the intermediate image;
   apply an inverse filter to the flipped intermediate image to generate a reconstructed image; and
   inversely flip the reconstructed image to generate an invertible reconstructed image,
   wherein to flip the intermediate image, the processor is further configured to:

flip the intermediate image in a flipping direction determined based on a frequency-domain phase shift caused by the forward filter or the inverse filter.

20. A method of storing a bitstream, comprising:

performing an encoding method to generate a bitstream; and storing the bitstream;

wherein the encoding method comprising:
- obtaining, by a processor, an image derived from a video frame of a video,
- applying, by the processor, a forward filter to the image to generate an intermediate image,
- flipping the intermediate image,
- applying, by the processor, an inverse filter to the flipped intermediate image to generate a reconstructed image,
- inversely flipping the reconstructed image to generate an invertible reconstructed image; and
- generating the bitstream comprising encoded video information associated with the invertible reconstructed image, wherein flipping the intermediate image comprises: flipping the intermediate image in a flipping direction determined based on a frequency-domain phase shift caused by the forward filter or the inverse filter.

* * * * *